US011215786B2

(12) United States Patent
Min et al.

(10) Patent No.: US 11,215,786 B2
(45) Date of Patent: Jan. 4, 2022

(54) LENS DRIVING DEVICE

(71) Applicant: LG INNOTEK CO., LTD., Seoul (KR)

(72) Inventors: Sang Jun Min, Seoul (KR); Sung Guk Lee, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 480 days.

(21) Appl. No.: 15/320,637

(22) PCT Filed: Jun. 2, 2015

(86) PCT No.: PCT/KR2015/005491
§ 371 (c)(1),
(2) Date: Dec. 20, 2016

(87) PCT Pub. No.: WO2015/199341
PCT Pub. Date: Dec. 30, 2015

(65) Prior Publication Data
US 2017/0146772 A1 May 25, 2017

(30) Foreign Application Priority Data

Jun. 25, 2014 (KR) .......................... 10-2014-0078295
Jul. 16, 2014 (KR) .......................... 10-2014-0089879
Aug. 1, 2014 (KR) .......................... 10-2014-0098823

(51) Int. Cl.
*G02B 7/09* (2021.01)
*G03B 5/00* (2021.01)
(Continued)

(52) U.S. Cl.
CPC ................. *G02B 7/09* (2013.01); *G03B 3/10* (2013.01); *G03B 5/00* (2013.01); *H02K 41/0356* (2013.01);
(Continued)

(58) Field of Classification Search
CPC ................. G02B 27/646; G02B 13/001; G02B 13/009; G02B 7/00; G02B 7/02; G02B 7/023;
(Continued)

(56) References Cited

U.S. PATENT DOCUMENTS

| 5,177,640 A | 1/1993 | Grassens |
| 2004/0174076 A1* | 9/2004 | Knirck ............... H02K 41/0356 310/12.04 |

(Continued)

FOREIGN PATENT DOCUMENTS

| CN | 1542773 A | 11/2004 |
| CN | 201034279 Y | 3/2008 |

(Continued)

OTHER PUBLICATIONS

International Search Report in International Application No. PCT/KR2015/005491, filed Jun. 2, 2015.
(Continued)

*Primary Examiner* — Joseph P Martinez
*Assistant Examiner* — Vipin Patel
(74) *Attorney, Agent, or Firm* — Saliwanchik, Lloyd & Eisenschenk

(57) ABSTRACT

One embodiment of a lens driving device may comprise: a cover member; a bobbin which is disposed within the cover member so as to be movable in a first direction; a first magnet which is disposed within the cover member to move the bobbin in the first direction; a winding ring which is coupled to the bobbin; a coil which is wound around the outer circumferential surface of the winding ring and applies current for the movement of the bobbin in the first direction; a base which is coupled to the lower end of the cover
(Continued)

member; and a flexible circuit board which is disposed on the lower side of the bobbin so as to be electrically connected with the coil.

18 Claims, 18 Drawing Sheets

(51) Int. Cl.
*G03B 3/10* (2021.01)
*H02K 41/035* (2006.01)
*H02K 11/215* (2016.01)

(52) U.S. Cl.
CPC .............. *G03B 2205/0007* (2013.01); *G03B 2205/0069* (2013.01); *H02K 11/215* (2016.01)

(58) Field of Classification Search
CPC ............ G02B 7/026; G02B 7/04; G02B 7/08; G02B 7/09; G02B 7/102; G02B 7/36; G03B 13/36; G03B 17/00; G03B 17/02; G03B 17/12; G03B 2205/0015; G03B 2205/0069; G03B 3/00; G03B 3/02; G03B 3/10; G03B 5/00; G03B 5/0007; G03B 5/0053; G03B 5/0069; G03B 5/02; G03B 2205/0007; H02K 11/20; H02K 11/21; H02K 11/215; H02K 2201/18; H02K 41/02; H02K 41/035; H02K 41/0352; H02K 41/0354; H02K 41/0356; H04N 5/2251; H04N 5/2252; H04N 5/2253; H04N 5/2254; H04N 5/2257; H04N 5/23212; H04N 5/23248; H04N 5/23264; H04N 5/23287; H04N 5/335; Y10T 29/49002; Y10T 29/4902; B81B 3/00
USPC ....... 359/554, 557, 694, 811, 814, 819, 822, 359/823, 824; 310/12.16; 257/684; 348/208.4, 208.5, 208.11, 208.2, 208.7, 348/208.99, 335, 345, 373, 374, E5.024, 348/E5.028, E5.045, E5.046; 396/52, 55, 396/133, 529
See application file for complete search history.

(56) References Cited

U.S. PATENT DOCUMENTS

| | | | | |
|---|---|---|---|---|
| 2011/0103782 | A1* | 5/2011 | Tsuruta | G02B 7/022 396/55 |
| 2012/0008221 | A1* | 1/2012 | Min | H02K 41/0356 359/824 |

FOREIGN PATENT DOCUMENTS

| | | | |
|---|---|---|---|
| CN | 101322305 | A | 12/2008 |
| JP | 05114144 | A | 5/1993 |
| JP | 10023728 | A | 1/1998 |
| JP | 2008136260 | A | 6/2008 |
| JP | 2012-177753 | A | 9/2012 |
| JP | 2013-104967 | A | 5/2013 |
| KR | 20090128825 | A | 12/2009 |
| KR | 10-2010-0125978 | A | 12/2010 |
| KR | 10-2012-0006364 | A | 1/2012 |
| KR | 20120045333 | A | 5/2012 |
| KR | 10-2012-0090381 | A | 8/2012 |
| KR | 20130060535 | A | 6/2013 |
| KR | 20140076405 | A | 6/2014 |

OTHER PUBLICATIONS

Office Action dated Oct. 29, 2018 in Chinese Application No. 201580034645.X.
Office Action dated Aug. 24, 2020 in Korean Application No. 10-2014-0078295.
Office Action dated Sep. 2, 2020 in Korean Application No. 10-2014-0089879.

* cited by examiner

LENS DRIVING DEVICE

CROSS-REFERENCE TO RELATED APPLICATIONS

This application is the U.S. national stage application of International Patent Application No. PCT/KR2015/005491, filed Jun. 2, 2015, which claims priority to Korean Application Nos. 10-2014-0078295, filed Jun. 25, 2014; 10-2014-0089879, filed Jul. 16, 2014; and 10-2014-0098823, filed Aug. 1, 2014, the disclosures of each of which are incorporated herein by reference in their entirety.

TECHNICAL FIELD

Embodiments relate to a lens moving apparatus.

BACKGROUND ART

In this section, the following description merely provides information regarding the background of embodiments, and does not constitute the conventional art.

In recent years, IT products having a miniaturized digital camera mounted therein, such as mobile phones, smartphones, tablet PCs, and laptop computers, have been actively developed.

In general, an IT product having a miniaturized digital camera mounted therein is provided therein with an image sensor for converting external light into a digital image or a digital video and a lens moving apparatus for adjusting the distance between the image sensor and a lens to control the focal distance of the lens.

In addition, the miniaturized digital camera is configured to perform a control process for finding the point on the image sensor at which the most sharply focused image is formed based on the sharpness of a digital image formed on the image sensor in accordance with the distance between the lens and the image sensor in order to perform auto focusing.

During auto focusing, a bobbin, in which the lens is mounted, is moved by a magnet in an optical-axis direction. At this time, an elastic member provided at the upper side and/or the lower side of the bobbin elastically supports the movement of the bobbin. A lens moving apparatus for moving a lens in a general digital camera uses an open loop control method of determining the initial position of the bobbin based on default pressure of the elastic member for supporting the bobbin, which is a moving unit, and controlling the amount of movement of the bobbin based on the amount of current.

In a lens moving apparatus used together with a large number of pixels, the accuracy in position of the lens is important. In the lens moving apparatus using the open loop control method, the position of the bobbin is not accurately controlled, with the result that it is difficult to find the optical focusing position of the lens mounted in the bobbin.

In addition, in the open loop control method, it is necessary to fully scan a subject in order to perform auto focusing, with the result that it takes a lot of time to perform auto focusing.

In general, a voice coil motor includes a bobbin, in which a lens is mounted, a coil wound around the bobbin, and a magnet facing the coil. In the case in which the coil is directly wound around the outer circumferential surface of the bobbin, the bobbin may shrink due to heat and tension of the coil, with the result that torque control may be difficult when the lens is coupled to the bobbin.

Alternatively, in the case in which a coil block is fixed to the bobbin using an adhesive, it is difficult to manage the amount of the adhesive, and the coil block may be separated from the bobbin.

In general, meanwhile, the miniaturized digital camera is configured to perform a control process for finding the point on the image sensor on which the most sharply focused image is formed based on the sharpness of a digital image formed on the image sensor in accordance with the distance between the lens and the image sensor in order to perform auto focusing. During auto focusing, the bobbin, in which the lens is mounted, is moved by a first magnet in an optical-axis direction. At this time, the elastic member provided at the upper side and/or the lower side of the bobbin elastically supports the movement of the bobbin.

When the bobbin is moved in the optical axis direction, however, the bobbin vibrates in the optical axis direction. As a result, the elastic member is vibrated, whereby noise is generated from the elastic member. In addition, a mechanical resonance phenomenon may occur.

DISCLOSURE

Technical Problem

Embodiments provide a lens moving apparatus that is capable of performing an accurate auto focusing function.

Further, embodiments provide a lens moving apparatus configured such that torque control can be easily performed when a lens is coupled to a bobbin and such that the coil is prevented from being separated from the bobbin.

Further, embodiments provide a lens moving apparatus configured such that noise is reduced, a mechanical resonance phenomenon is reduced, the structure of the lens moving apparatus is simplified, and the manufacturing cost of the lens moving apparatus is reduced.

Technical Solution

In one embodiment, a lens moving apparatus includes a cover member, a bobbin provided in the cover member so as to be movable in a first direction, a first magnet provided in the cover member for moving the bobbin in the first direction, a winding ring coupled to the bobbin, a coil wound around the outer circumferential surface of the winding ring for supplying current to the bobbin such that the bobbin is moved in the first direction, an electrical conduction member provided at the lower portion of the bobbin, a position sensor and a sensing magnet coupled to one selected from between the cover member and the bobbin, an inner yoke integrally formed at the inside of the cover member, a second circuit board connected to the electrical conduction member, and a displacement sensing unit for determining a displacement value of the bobbin in the first direction.

In another embodiment, a lens moving apparatus includes a cover member, a bobbin provided in the cover member so as to be movable in a first direction, a first magnet provided in the cover member for moving the bobbin in the first direction, a winding ring coupled to the bobbin, a coil wound around the outer circumferential surface of the winding ring for supplying current to the bobbin such that the bobbin is moved in the first direction, a base coupled to the lower end of the cover member, and a flexible circuit board provided at the lower side of the bobbin so as to be connected to the coil.

Advantageous Effects

In the lens moving apparatus according to the embodiment, a feedback control method is used, whereby it is possible to accurately perform auto focusing and to reduce auto focusing time.

In addition, in the case in which a flexible circuit board is used as an electrical conduction member, it is possible to prevent the occurrence of defective products due to deformation of an elastic member and the deterioration of quality of a captured picture.

In addition, a flexible circuit board is used in place of an upper or lower elastic member, whereby it is possible to avoid vibration inevitably generated by the elastic member and a mechanical resonance phenomenon due to the vibration. Furthermore, it is possible to considerably reduce the amount of vibration that is generated by the elastic member.

In addition, upper and lower elastic member used in a general lens moving apparatus and a first magnet may be omitted, whereby it is possible to reduce the manufacturing cost of the lens moving apparatus and to simplify the manufacturing process of the lens moving apparatus.

In addition, a coil is wound around the outer circumferential surface of a winding ring, rather than on a bobbin, whereby it is possible to prevent deformation of the bobbin due to heat or tension generated during winding of the coil, thereby preventing the change of a lens assembly torque.

In addition, the winding ring is spaced apart from the outer circumferential surface of the bobbin by a predetermined distance, whereby it is possible to reduce the amount of foreign matter introduced into a space between the coil and the magnet. As a result, a magnetic field between the coil and the magnet is less affected by the foreign matter. Consequently, it is possible to more accurately control upward and downward movement of the bobbin than in a conventional lens moving apparatus.

BEST MODE

Figure 1A:
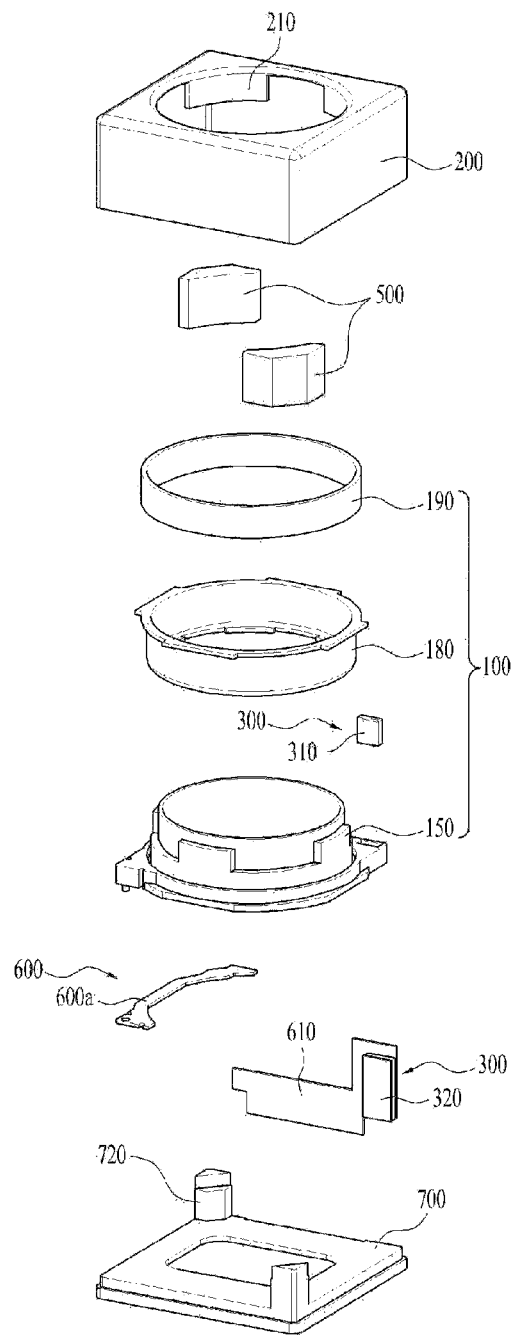
FIG. 1A is an exploded perspective view showing a lens moving apparatus according to an embodiment.

Reference will now be made in detail to the preferred embodiments, examples of which are illustrated in the accompanying drawings. While the disclosure is susceptible to various modifications and alternative forms, specific embodiments thereof are shown by way of example in the drawings. However, the disclosure should not be construed as limited to the embodiments set forth herein, but on the contrary, the disclosure is to cover all modifications, equivalents, and alternatives falling within the spirit and scope of the embodiments. In the drawings, sizes and shapes of elements may be exaggerated for convenience and clarity of description.

It may be understood that, although the terms "first," "second," etc. may be used herein to describe various elements, these elements should not be limited by these terms. These terms are generally only used to distinguish one element from another. In addition, terms particularly defined in consideration of construction and operation of the embodiments are used only to describe the embodiments, but do not define the scope of the embodiments.

It will be understood that when an element is referred to as being "on" or "under" another element, it can be directly on/under the element, and one or more intervening elements may also be present. When an element is referred to as being "on" or "under," "under the element" as well as "on the element" can be included based on the element.

In addition, relational terms, such as "on/upper part/above" and "under/lower part/below," are used only to distinguish between one subject or element and another subject and element without necessarily requiring or involving any physical or logical relationship or sequence between such subjects or elements.

In addition, a rectangular coordinate system (x, y, z) may be used in the figures. In the figures, an x axis and a y axis are planes perpendicular to an optical axis. For the sake of convenience, the optical-axis direction (the z-axis direction) may be referred to as a first direction, the x-axis direction may be referred to as a second direction, and the y-axis direction may be referred to as a third direction.

Figure 1B:
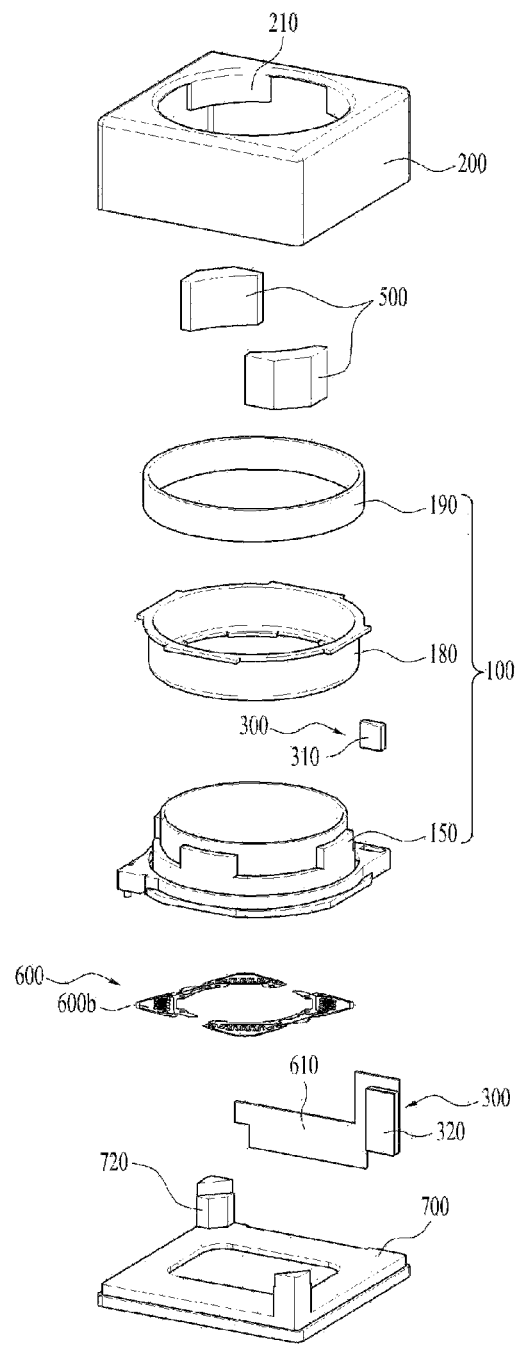
FIG. 1B is an exploded perspective view showing a lens moving apparatus according to another embodiment.
Figure 2:
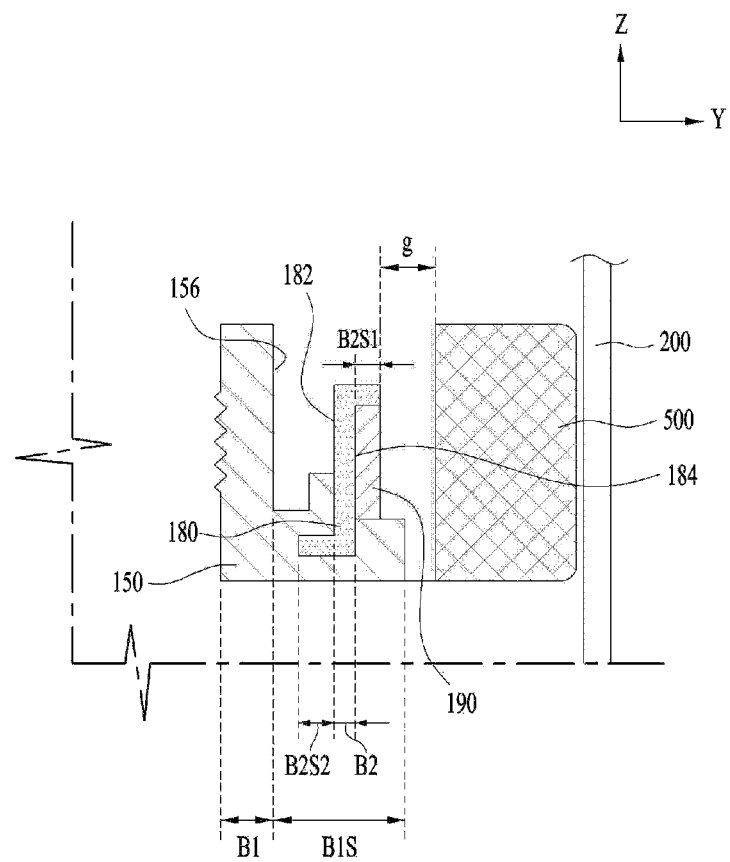
FIG. 2 is a partially cutaway sectional view of the lens moving apparatus illustrated in FIGS. 1A and 1B.

FIG. 1A is an exploded perspective view showing a lens moving apparatus according to an embodiment. FIG. 1B is an exploded perspective view showing a lens moving apparatus according to another embodiment. FIG. 2 is a partially cutaway sectional view of the lens moving apparatus illustrated in FIGS. 1A and 1B.

The lens moving apparatus illustrated in FIGS. 1A, 1B, and 2 may include a mover 100, a cover member 200, a first magnet 500, and a base 700. The cover member 200 may be coupled to the base 700, and the lower side of the cover member 200 may be supported by the base 700. In addition, the cover member 200 may be hollow, and an inner yoke 210 for blocking a magnetic field may be integrally formed with the cover member 200. The detailed structure of the inner yoke 210 will be described later.

The cover member 200 may be made of a ferromagnetic material such as iron. In addition, when viewed from above, the outer edge of the cover member 200 may be angle-shaped and the inner edge of the cover member 200 may be circular such that the cover member 200 can surround a bobbin 150. However, the disclosure is not limited thereto. As shown in FIGS. 1A and 1B, the cover member 200 may be octagonal. Unlike what is shown, the cover member 200 may be quadrangular. In addition, in the case in which the shape of first magnets 500 disposed at corners of the cover member 200 is trapezoidal when viewed from above, it is possible to minimize the leakage of a magnetic field outward from the corners of the cover member 200.

The first magnets 500 are provided at the cover member 200 to drive the mover 100. The first magnets 500 may be directly fixed to the cover member 200. In the case in which the first magnets 500 are directly fixed to the cover member 200, the first magnets 500 may be directly fixed to the edge or the corners of the cover member 200 by bonding.

In the case in which the cover member 200 is made of a metal, the larger the number of surfaces of the cover member 200 with which the first magnets 500 are in surface contact, the more effectively a magnetic field may be blocked. In addition, at least two surfaces of each first magnet 500 may contact the cover member 200. For example, in the case in which the shape of each first magnet 500 is trapezoidal when viewed from above in a first direction, at least three surfaces of each first magnet 500 may contact the inner edge of the cover member 200. In the illustrated embodiments, the first magnets 500 are disposed at two corners of the cover member 200. Alternatively, the first magnets 500 may be disposed at four corners of the cover member 200.

Meanwhile, the mover 100 may include a bobbin 150, a winding ring 180, and a coil 190.

The bobbin 150 may be mounted in the cover member 200 so as to reciprocate in the first direction. The winding ring 180 may be coupled to the outer circumferential surface of the bobbin 150 such that the bobbin 150 can electromagnetically interact with the first magnets 500. In addition, the coil 190 may be wound around or coupled to the outer circumferential surface of the winding ring 180.

The bobbin 150 may be coupled to a lens barrel (not shown), in which at least one lens is mounted. The lens barrel may be formed so as to be screw-coupled to the inside of the bobbin 150. However, the disclosure is not limited thereto. Although not shown, the lens barrel may be directly fixed to the inside of the bobbin 150 using methods other than screw coupling, or one or more lenses may be integrally formed with the bobbin 150, without the lens barrel. A single lens may be provided, or two or more lenses may be provided to constitute an optical system.

Meanwhile, as shown in FIG. 2, each first magnet 500 may be spaced apart from the winding ring 180 by a predetermined distance g. According to this construction, as shown in FIG. 2, an upper elastic member 410 is prevented from contacting and interfering with the first magnets 500 when the bobbin 150 moves upward and downward in the first direction, whereby the bobbin 150 may move smoothly. The distance g may be set in the horizontal direction, the circular direction, the vertical direction, or the direction satisfying the above conditions. The reason for this is that it is necessary for the winding ring 180 to be spaced apart from the first magnets 500 by the predetermined distance or more when the bobbin 150 moves.

Meanwhile, the winding ring 180 may be coupled to the bobbin 150, and the coil 190 may be wounded around the outer circumferential surface 184 of the winding ring 180 so as to have a ring shape.

Hereinafter, embodiments of the bobbin 150, the winding ring 180, and the coil 190 of the mover 100 will be described in detail with reference to the accompanying drawings. For the convenience of description, the winding ring 180 and the bobbin 150 will be described as separate members. Alternatively, the bobbin 150 and the winding ring 180 may be integrally formed by insert injection molding. The winding ring 180 may be detachably attached to the bobbin 150.

The bobbin 150 may include a first body unit B1 and a supporting portion B1S.

The first body unit B1 may receive at least one lens therein. The first body unit B1 may be formed in a hollow cylindrical shape. The cylindrical bobbin 150 may include an upper end 152 and a lower end 154 opposite to the upper end 152.

In order to receive the lens therein, the bobbin 150 may be provided at the inner circumferential surface thereof with a female screw, and the lens barrel may be coupled to the female screw.

The supporting portion B1S of the bobbin 150 may protrude outward from the outer circumferential surface 156 of the first body unit B1.

As illustrated in FIGS. 1A, 1B, and 2, the supporting portion B1S may be integrally formed with the first body unit B1. However, the disclosure is not limited thereto. That is, in other embodiments, the supporting portion B1S and the first body unit B1 may be provided separately, and the supporting portion B1S may be attached to the first body unit B1.

In addition, the supporting portion B1S is shown as protruding from the lower end of the first body unit B1. However, the disclosure is not limited thereto. That is, in other embodiments, the supporting portion B1S may protrude from the middle end or the upper end of the first body unit B1, in addition to the lower end of the first body unit B1, as long as the supporting portion B1S supports the winding ring 180.

FIGS. 3A to 3D are sectional views respectively showing embodiments 150A, 150B, 150C, and 150D of the bobbin 150 illustrated in FIGS. 1A, 1B, and 2.

As illustrated in FIGS. 3A to 3D, the supporting portion B1S may include a first recess H1. The first recess H1 may extend in the first direction of the lens. In this case, as illustrated in FIG. 2, the winding ring 180 may be formed so as to be received in the first recess H1.

Figure 3A:
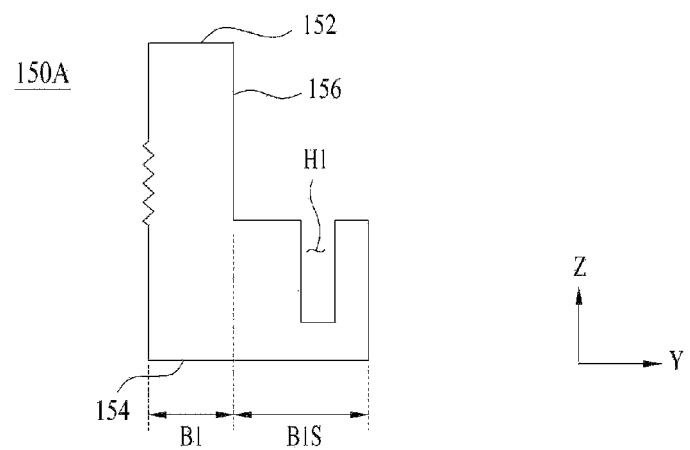
FIGS. 3A to 3D are sectional views showing embodiments of a bobbin illustrated in FIGS. 1 and 2.
Figure 3B:
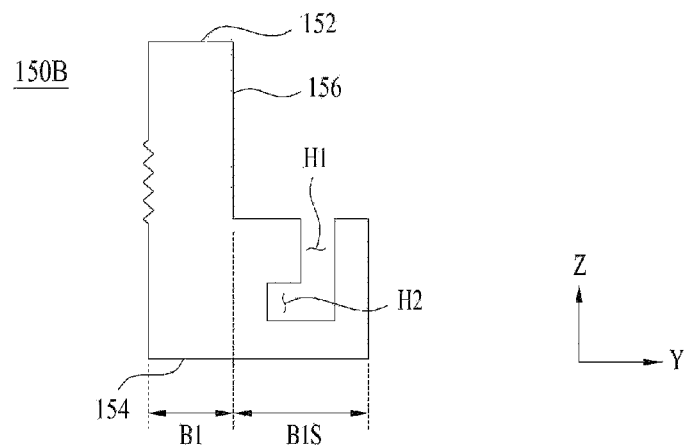
Figure 3C:
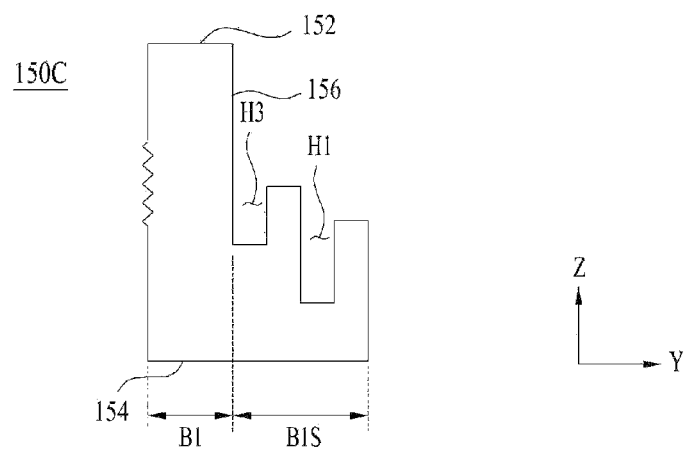
Figure 3D:
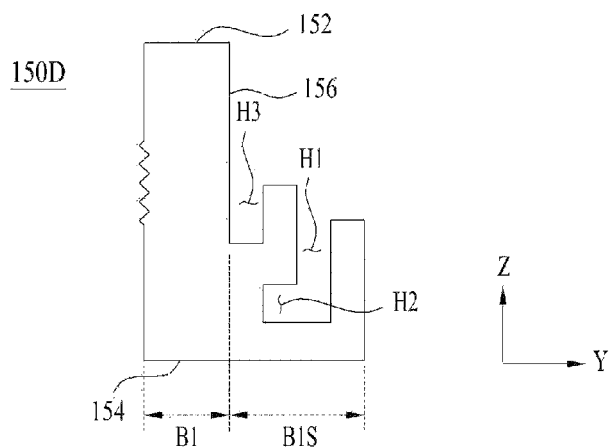

In addition, as illustrated in FIGS. 3B and 3D, the supporting portion B1S may further include a second recess H2. The second recess H2 may communicate with the first recess H1 and extend in a second direction (e.g. a Y-axis direction) different from the first direction. In this case, as illustrated in FIG. 2, the winding ring 180 may be formed so as to be received in both the first recess H1 and the second recess H2. Consequently, the winding ring 180 may be securely supported by the supporting portion B1S.

In addition, as illustrated in FIGS. 3A to 3D, the first recess H1 may be spaced apart from the outer circumferential surface 156 of the first body unit B1.

In addition, as illustrated in FIGS. 3C and 3D, the supporting portion B1S may further include a third recess H3. The third recess H3 may extend between the first recess H1 and the outer circumferential surface 156 of the first body unit B1 in the first direction.

The disclosure is not limited as to the depths of the first to third recesses H1 to H3. For example, the first recess H1 may have an appropriate depth to receive and support the winding ring 180.

In addition, in the illustrated embodiment, the winding ring 180 may include a magnetic material. However, the disclosure is not limited as to the kind of material constituting the winding ring 180. That is, in other embodiments, the winding ring 180 may include a non-magnetic material.

Referring back to FIGS. 1A, 1B, and 2, the winding ring 180, which is formed so as to be supported by the bobbin 150, may include a second body unit. The second body unit may include at least one second body B2, a guide B2S1, and catching protrusions B2S2.

The coil 190 may be wound around the outer circumferential surface 184 of the second body B2. The coil 190 may be disposed at positions corresponding to the first magnets 500. In the illustrated embodiments, the coil 190 is shown as having a circular planar shape. In other embodiments, the coil 190 may have an angular shape, such as an octagonal shape. Since the coil 190 is wound around the winding ring 180, the planar shape of the coil 190 may be identical to that of the winding ring 180.

For example, the coil 190 may be a circular coil or a quadrangular coil, and may be made of copper, aluminum, or an alloy of copper and aluminum. However, the disclosure is not limited thereto. In addition, the coil may be coated with an insulative material.

Facing surfaces of the coil 190 and each first magnet 150 may have the same curvature. However, the disclosure is not limited thereto. The coil 190 is disposed opposite to each first magnet 150 in consideration of electromagnetic action. The reason for this is that when the surface of each first magnet 150 is flat and the corresponding surface of the coil 190 is flat, electromagnetic force can be maximized.

However, the disclosure is not limited thereto. The surface of each first magnet 150 and the corresponding surface of the coil 190 may be curved or flat based on design specifications. Alternatively, the surface of each first magnet 150 may be curved and the corresponding surface of the coil 190 may be flat, or the surface of each first magnet 150 may be flat and the corresponding surface of the coil 190 may be curved.

The second body B2 of the second body unit may be supported by the supporting portion B1S of the bobbin 150. The inner circumferential surface 182 of the second body B2 may be opposite to the outer circumferential surface 156 of the bobbin 150.

According to the embodiments, the winding ring 180 may have the same planar shape as the bobbin 150. As illustrated in FIGS. 1A and 1B, the winding ring 180 and the bobbin 150 are shown as having an annular planar shape. However, the disclosure is not limited thereto.

That is, the bobbin 150 and the winding ring 180 may have various planar shapes, such as a polygonal planar shape. Alternatively, the planar shape of the bobbin 150 may be different from that of the winding ring 180. The shape of the winding ring 180, on which the coil 190 is wound, may be changed such that the surface of the coil 190 facing each first magnet 500 has a desired curvature.

The second body B2 of the winding ring 180 may be spaced apart from the first body unit B1 of the bobbin 150 in the second direction. The second direction may be the Y-axis direction, which is different from the first direction.

Hereinafter, various embodiments of the winding ring 180 will be described with reference to FIGS. 4A to 4D and 5A to 5C.

FIGS. 4A to 4D are perspective views showing embodiments 180A, 180B, 180C, and 180D of the winding ring 180 illustrated in FIG. 2.

Figure 4A:
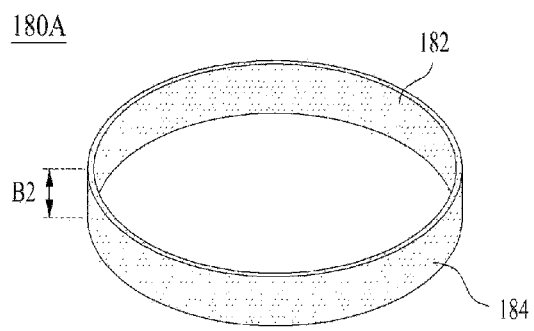
FIGS. 4A to 4D are perspective views showing embodiments of a winding ring illustrated in FIG. 2.
Figure 4B:
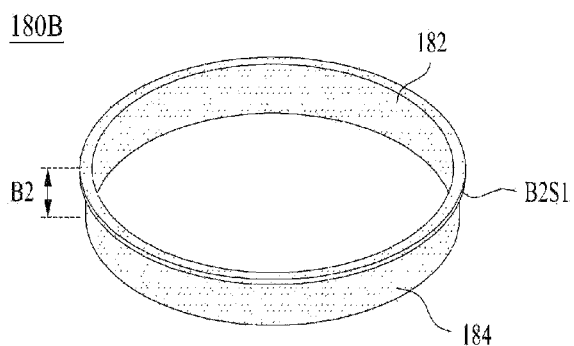
Figure 4C:
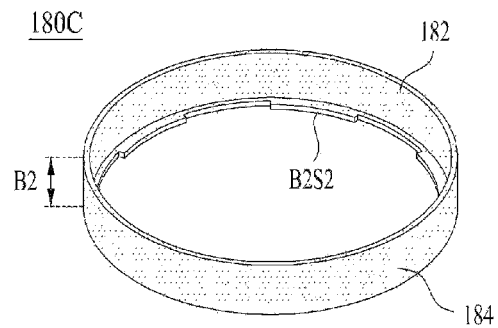
Figure 4D:
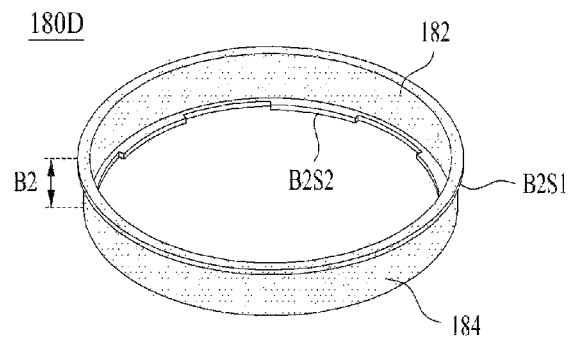

As illustrated in FIGS. 4B and 4D, the winding ring 180B or 180D may include a guide unit B2S1. The guide unit B2S1 may define a winding area CA protruding outward from the upper end of the second body B2 of the winding ring 180B or 180D such that the coil 190 is wound in the winding area CA. That is, as illustrated in FIG. 2, the coil 190 may be wound up to just under the guide unit B2S1.

According to circumstances, as illustrated in FIGS. 4A and 4C, the guide unit B2S1 may be omitted from the winding ring 180A or 180C.

In addition, as illustrated in FIGS. 4C and 4D, the winding ring 180C or 180D may further include catching protrusions B2S2. The catching protrusions B2S2 may protrude inward from the lower end of the inner circumferential surface 182 of the second body B2, and each may have an appropriate shape to be received in the second recess H2 of the supporting portion B1S of the bobbin 150B or 150D illustrated in FIG. 3B or 3D. According to circumstances, as illustrated in FIGS. 4A and 4B, the catching protrusions B2S2 may be omitted from the winding ring 180A or 180B.

In the case in which the catching protrusions B2S2 are formed at the winding ring 180C or 180D, as previously described, the coupling force between the bobbin 150B or 150D and the winding ring 180C or 180D may be increased, whereby the bobbin 150B or 150D and the winding ring 180C or 180D may not be separated from each other. The catching protrusions B2S2 are shown as being serrated. However, the disclosure is not limited thereto.

FIGS. 5A to 5E are perspective views showing modifications 180D-1, 180D-2, 180D-3, 180D-4, and 180D-5 of the winding ring 180D illustrated in FIG. 4D.

The winding ring 180D illustrated in FIG. 4D has a guide unit B2S1 and catching protrusions B2S2. The winding ring 180D may be modified so as to have various shapes, as illustrated in FIGS. 5A to 5E.

In the winding ring 180D illustrated in FIG. 4D, the inner circumferential surface 182 of the second body B2 may be opposite to the entirety of the outer circumferential surface 156 of the bobbin 150.

Alternatively, as illustrated in FIGS. 5A to 5E, the inner circumferential surface 182 of the second body B2 may be opposite to a portion of the outer circumferential surface 156 of the bobbin 150.

Figure 5A:
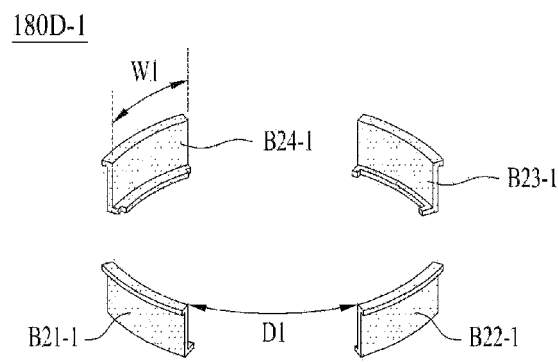
FIGS. 5A to 5E are perspective views showing modifications of the winding ring illustrated in FIG. 4D.
Figure 5B:
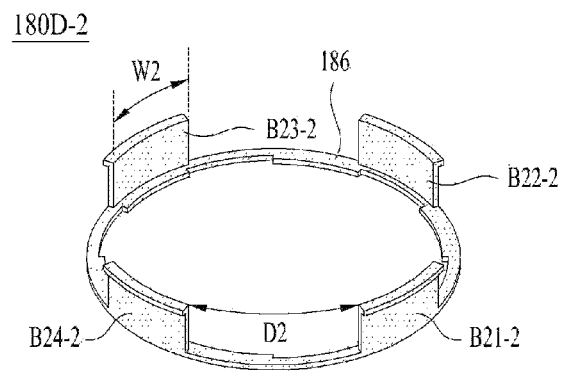
Figure 5C:
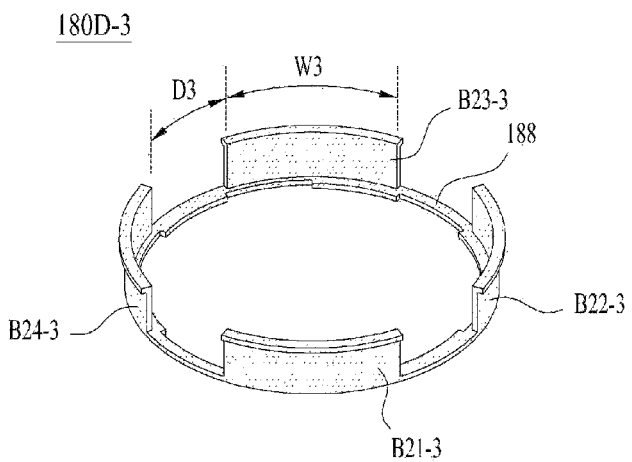

In addition, as illustrated in FIGS. 5A to 5C, a plurality of second bodies 182 may be provided. In this case, each of the second bodies 182 may be formed in the shape of a pillar. However, the disclosure is not limited thereto.

Referring to FIG. 5A, the second bodies B21-1, B22-1, B23-1, and B24-1 of the winding ring 180D-1 may be arranged at intervals. The second bodies B21-1, B22-1, B23-1, and B24-1 may be arranged at regular or irregular intervals.

In addition, a first distance D1 by which the second bodies B21-1, B22-1, B23-1, and B24-1 are spaced apart from each other may be greater than a first width W1 of each of the second bodies B21-1, B22-1, B23-1, and B24-1. However, the disclosure is not limited thereto. In other embodiments, the first distance D1 may be equal to or less than the first width W1.

In a similar manner, referring to FIG. 5B, the second bodies B21-2, B22-2, B23-2, and B24-2 of the winding ring 180D-2 may be arranged at intervals. The second bodies B21-2, B22-2, B23-2, and B24-2 may be arranged at regular or irregular intervals.

In addition, a second distance D2 by which the second bodies B21-2, B22-2, B23-2, and B24-2 are spaced apart from each other may be greater than a second width W2 of each of the second bodies B21-2, B22-2, B23-2, and B24-2. However, the disclosure is not limited thereto. In other embodiments, the second distance D2 may be equal to or less than the second width W2.

In a manner similar to that shown in FIGS. 5A and 5B, referring to FIG. 5C, the second bodies B21-3, B22-3, B23-3, and B24-3 of the winding ring 180D-3 may be arranged at intervals. The second bodies B21-3, B22-3, B23-3, and B24-3 may be arranged at regular or irregular intervals.

Unlike FIGS. 5A and 5B, however, a third distance D3 by which the second bodies B21-3, B22-3, B23-3, and B24-3 illustrated in FIG. 5C are spaced apart from each other may be less than a third width W3 of each of the second bodies B21-3, B22-3, B23-3, and B24-3. However, the disclosure is not limited thereto. In other embodiments, the third distance D2 may be equal to or greater than the third width W3.

In addition, as illustrated in FIG. 5A, the second bodies B21-1, B22-1, B23-1, and B24-1 may not be connected to each other. On the other hand, the lower ends of the second bodies B21-2, B22-2, B23-2, and B24-2, illustrated in FIG. 5B, may be connected to each other via a first lower end connection portion 186. In addition, the lower ends of the second bodies B21-3, B22-3, B23-3, and B24-3 illustrated in FIG. 5C may be connected to each other via a second lower end connection portion 188.

In addition, the catching protrusions B2S2 may be parts of the first or second lower end connection portion 186 or 188.

Figure 5D:
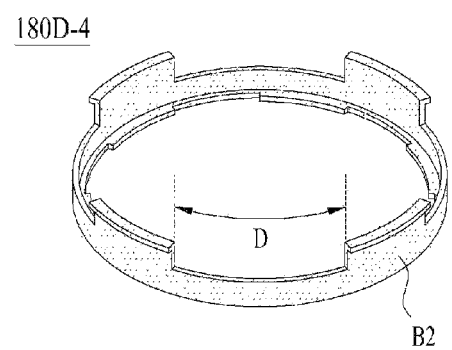
Figure 5E:
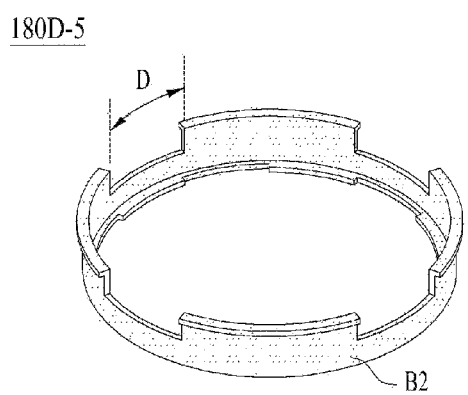

In addition, as illustrated in FIGS. 5D and 5E, the upper portion of the second body B2 of the winding ring 180D-4 or 180D-5 may be formed so as to have a concave and convex shape.

Meanwhile, the coil 190 may be wound around the outer circumferential surface 184 of the second body B2 of the winding ring 180.

FIGS. 6A to 6D are views showing the state in which the coil 190 is coupled to the winding rings 180A to 180D illustrated in FIGS. 4A to 4D.

Figure 6A:
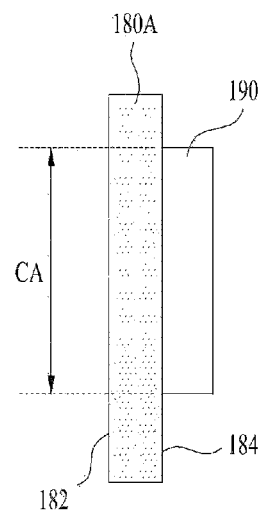
FIGS. 6A to 6D are views showing the state in which a coil is coupled to the winding rings illustrated in FIGS. 4A to 4D.
Figure 6B:
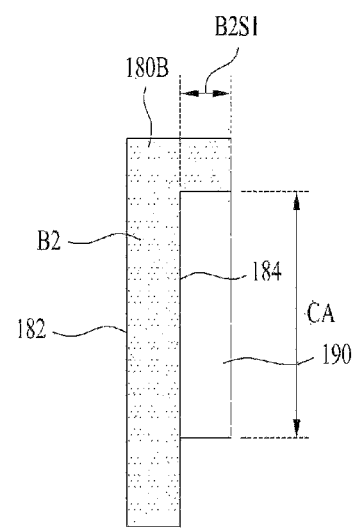
Figure 6C:
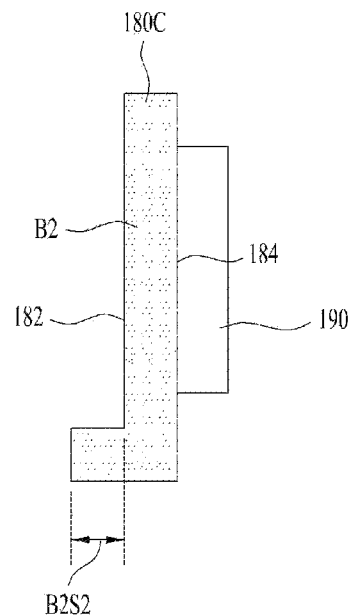
Figure 6D:
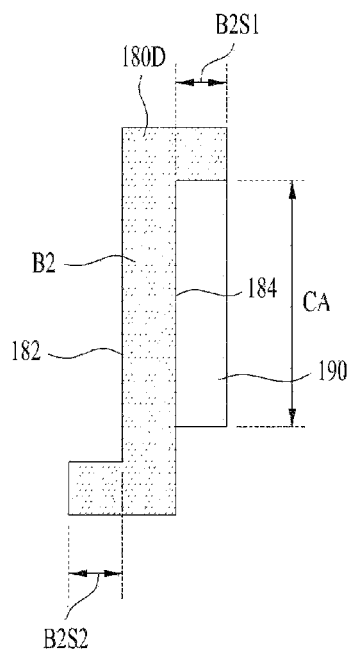

FIGS. 6A to 6D, in which the winding rings 180A, 180B, 180C, and 180D are illustrated, may be sectional views of the winding rings 180A, 180B, 180C, and 180D illustrated in FIGS. 4A to 4D. Referring to FIGS. 6A to 6D, the coil 190 may be wound in the winding area CA. As illustrated in FIG. 6B or 6D, the winding area CA may be defined by the guide unit B2S1.

Figure 7:
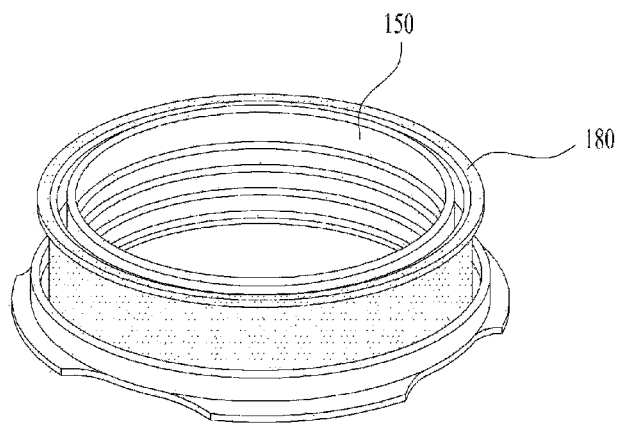
FIG. 7 is a perspective view showing the state in which the coil is coupled to the winding ring.

FIG. 7 is a perspective view showing the state in which the coil 190 is coupled to the winding ring 180B or 180D. Referring to FIG. 7, the coil 190 may be wound around the outer circumferential surface 184 of the winding ring 180B or 180D illustrated in FIG. 6B or 6D.

In addition, the winding ring 180 and the coil 190 may be coupled to each other using an adhesive or by insert injection molding. However, the disclosure is not limited thereto.

Figure 8:
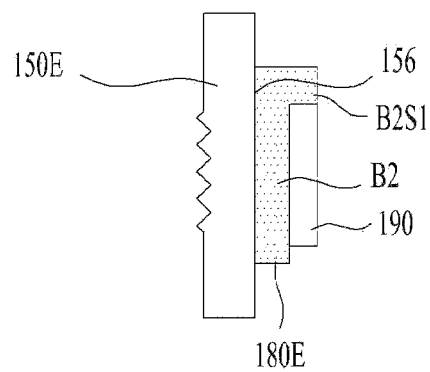
FIG. 8 is a sectional view showing the state in which a winding ring is coupled to a bobbin according to another embodiment.

FIG. 8 is a sectional view showing the state in which a winding ring 180E is coupled to a bobbin 150E according to another embodiment.

As illustrated in FIG. 8, in this embodiment, the winding ring 180E may be formed around the outer circumferential surface 156 of the bobbin 150E by coating. In this case, the winding ring 180E, which is formed around the outer circumferential surface 156 of the bobbin 150E, may further include a guide unit B2S1. The guide unit B2S1 may define a winding area protruding outward from the upper end of the second body B2 of the winding ring 180E such that the coil 190 is wound in the winding area.

Referring back to FIGS. 1A, 1B, and 2, the first magnets 500 may be opposite to the coil 190 such that the first magnets 500 interact with the coil 190 to move the bobbin 150 in the first direction. That is, the bobbin 150 may be moved upward in the first direction by the force generated by the magnetic field generated from each first magnet 500 and the current flowing in the coil 190 according to Fleming's left hand rule.

At this time, the bobbin 150 may be flexibly supported by upper and lower elastic members 410 and 420, as previously described. The amount of current that is supplied to the coil 190 may be finely adjusted so as to precisely adjust the movement distance of the bobbin 150 in the first direction.

Figure 9A:
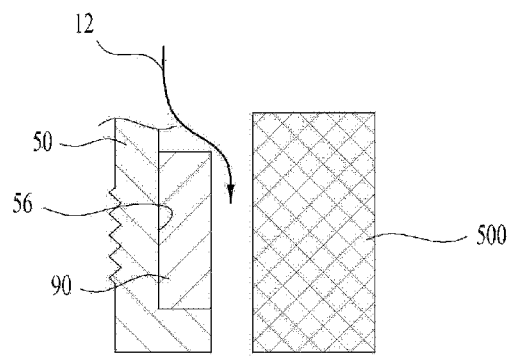
FIGS. 9A and 9B are sectional views respectively showing a conventional lens moving apparatus and the lens moving apparatus according to the embodiment.
Figure 9B:
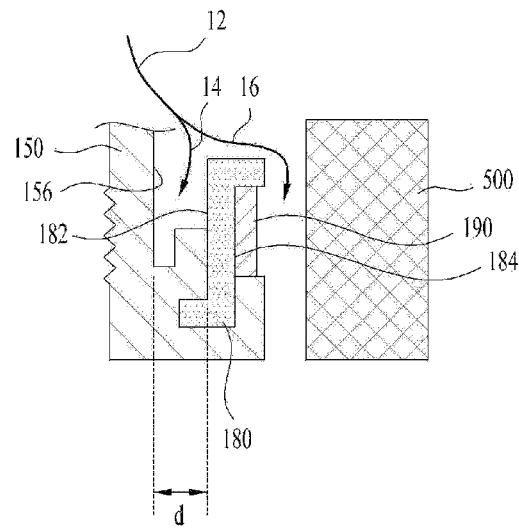

FIGS. 9A and 9B are sectional views respectively showing a conventional lens moving apparatus and the lens moving apparatus according to the embodiment. Referring to FIG. 9A, in the conventional lens moving apparatus, a coil 90 may be directly wound around the outer circumferential surface 56 of a bobbin 50, or the coil 90 as a block may be attached to the outer circumferential surface 56 of the bobbin 50 using an adhesive. In the case in which the coil 90 is directly wound around the bobbin 50, a lens assembly torque may be changed after the coil 90 is wound.

Referring to FIG. 9B, on the other hand, in the lens moving apparatus according to the embodiment, the coil 190 is wound around the outer circumferential surface 184 of the winding ring 180. Consequently, it is possible to prevent deformation of the bobbin 150 due to heat or tension generated during winding of the coil, thereby preventing the change of a lens assembly torque.

In addition, referring to FIG. 9A, in the conventional lens moving apparatus, since the coil 90 is directly wound around the outer circumferential surface 56 of the bobbin 50, external foreign matter 12 may be easily introduced into the space between the coil 90 and the first magnets 500.

Referring to FIG. 9B, on the other hand, in the lens moving apparatus according to the embodiment, the inner circumferential surface 182 of the winding ring 180 may be spaced apart from the outer circumferential surface 156 of the bobbin 150 by a predetermined distance d. When external foreign matter 12 is introduced into the lens moving apparatus, therefore, some 14 of the foreign matter 12 may be introduced into a space defined by the distance D, whereby only the remainder 16 of the foreign matter 12 may be introduced into a space between the coil 190 and the first magnets 500.

As compared with FIG. 9A, therefore, the amount of foreign matter 16 introduced into the space between the coil 190 and the first magnets 500 may be considerably reduced. As a result, the magnetic field between the coil 190 and the first magnets 500 is less affected by the foreign matter 12. Consequently, it is possible to more accurately control the upward and downward movement of the bobbin 150 than in the conventional lens moving apparatus. To this end, for example, the first distance d may be 0.05 mm to 0.5 mm. However, the disclosure is not limited thereto.

Meanwhile, in the above embodiment, the coil is wound around the winding ring 180, and the first magnets 50 are provided on the inside of the cover member 200 so as to be opposite to the coil 190. In other embodiments, the opposite structure may be provided. That is, the winding ring may be formed in a polygonal shape, the first magnets 500 may be fixed or coupled to the respective surfaces of the polygon, and the coil 19 may be provided at the inside of the cover member 200 so as to be opposite to the first magnets 500.

In this case, the winding ring guides the first magnets 500, which are fixed or coupled to the winding ring, so as to move in the first direction, and the coil 190 is not wound around the winding ring. Consequently, the winding ring may be referred to as a guide ring.

Figure 10A:
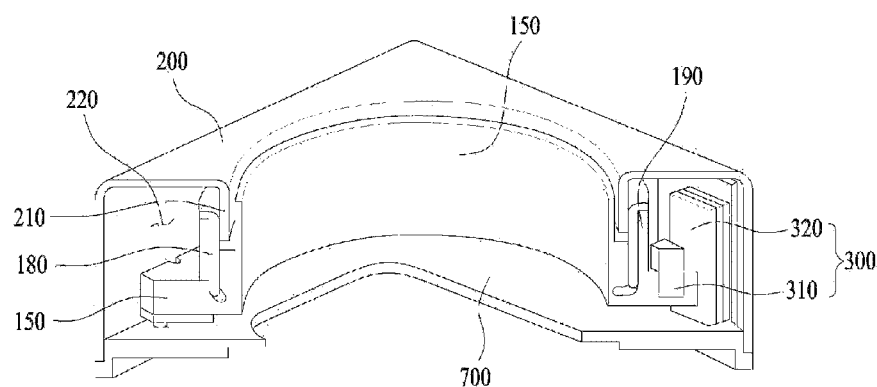
FIG. 10A is a view showing the interior of the lens moving apparatus according to the embodiment.
Figure 10B:
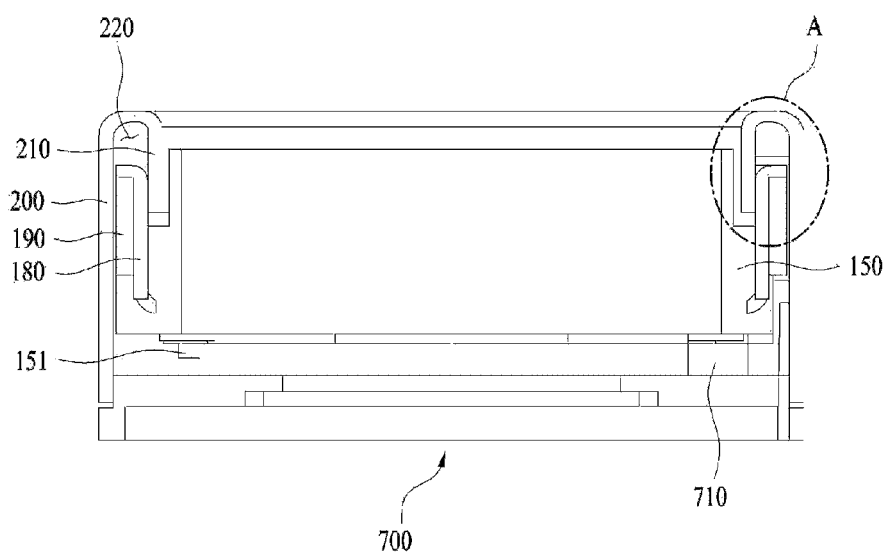
FIG. 10B is a sectional view of the lens moving apparatus according to the embodiment.
Figure 10C:
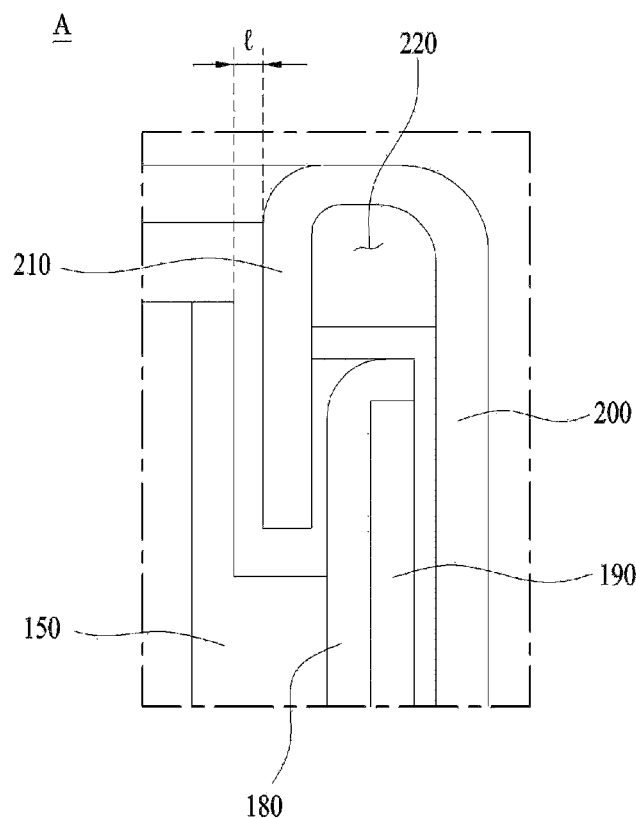
FIG. 10C is a partially enlarged view of FIG. 10B.

FIG. 10A is a view showing the interior of the lens moving apparatus according to the embodiment. FIG. 10B is a sectional view of the lens moving apparatus according to the embodiment. FIG. 10C is a partially enlarged view of FIG. 10B.

In the embodiment, the inner yoke 210 for blocking a magnetic field to prevent the leakage of the magnetic field to the outside is integrally formed with the inner circumferential surface of the upper portion of the cover member 200. The cover member 200 may mainly block the leakage of the magnetic field to the upper surface and the outer surface of the cover member 200, and the inner yoke 210 may mainly block the leakage of the magnetic field in the inner circumferential direction thereof.

In the embodiment, when viewed in the first direction or from above, the inner yoke 210 has a circular sectional shape. However, the disclosure is not limited thereto. The inner yoke 210 may have a polygonal sectional shape. In addition, the winding ring 180 and the coil 190 may have a circular or polygonal sectional shape corresponding to that of the inner yoke 210. However, the disclosure is not limited thereto. The shape of the winding ring 180 may be different from that of the coil 190 or the inner yoke 210.

Since the outer surface of the inner yoke 210 and the inner surface of the cover member 200 are spaced apart from each other by a predetermined distance, a receiving portion 220 is formed therebetween. That is, the receiving portion 220, which is a space formed between the inner yoke 210 and the cover member 200, is formed in a shape having a closed upper end and an open lower end. The receiving portion 220 extends in the circumferential direction of the inner yoke 210. Unlike the embodiment, the cover member 200 may be provided alone, without the yoke member 210.

At least a portion of the winding ring 180 and/or the coil 190 may be received in the receiving portion 220. In addition, at least a portion of the first magnets 500, a second magnet 310 for sensing coupled to the bobbin 150, and a position sensor 320 provided so as to face the second magnet 310 for sensing the position of the second magnet 310 in the first direction may be received in the receiving portion 220.

At least one first magnet 500 may be spaced apart from the second magnet 310 by a predetermined distance in the circumferential direction of the winding ring 180. In the embodiment, a pair of first magnets 500 may be provided at corners of the receiving portion 220 located at opposite sides of the corner of the receiving portion 220 at which the second magnet 310 and the position sensor 320 are provided so as to face each other.

The first magnets 500 may be formed in the shape of a trapezoidal pillar so as to correspond to the respective corners of the receiving portion 220. However, the disclosure is not limited thereto. The first magnets 500 may be formed in a polygonal shape, such as a triangular shape. In the case in which the first magnets 500 are formed in the shape of a trapezoidal pillar, it is possible to minimize the leakage of a magnetic field from the corners of the cover member 200 to the outside. In addition, each corner of each prismatic first magnet 500 may include a curved surface, which may be a curved surface formed by cutting, or may have a curved shape.

As described above, the first magnets 500, the second magnet 310, and the position sensor 320 are optimally disposed in the receiving portion 220 in consideration of the shape of the receiving portion 220. However, the disclosure is not limited thereto. The first magnets 500, the second magnet 310, and the position sensor 320 may be disposed in the receiving portion 220 so as to have a positional relationship different from the above-described positional relationship.

For example, two, four, or eight first magnets 500 may be disposed at the edge of the receiving portion 220, rather than at the corners of the receiving portion 220, so as to face each other, and the first magnets 500 may be formed in the shape of a rectangular parallelepiped, a regular hexahedron, or a quadrangular pillar, rather than a trapezoidal shape. In addition, this disposition may be changed depending on the shape of the cover member 200 and the inner yoke 210. In addition, each corner of each prismatic first magnet 500 may include a curved surface, which may be a curved surface formed by cutting or may have a curved shape.

In the case in which the integrated inner yoke 210 having the above structure is used in the embodiment, it is possible to considerably reduce the amount of foreign matter that is introduced into the upper end of the lens moving apparatus. That is, since the inner yoke 210 is disposed in at least a portion of the space between the upper portion of the bobbin 150 and the winding ring 180, the path along which external foreign matter is introduced into the lens moving apparatus is complicated, whereby it is possible to considerably reduce the amount of foreign matter that is introduced into the lens moving apparatus.

Meanwhile, in the embodiment, the inner yoke 210 and the winding ring 180 are provided in the receiving portion 220 such that the outer surface of the inner yoke 210 and the inner surface of the winding ring 180 correspond to each other in the state in which the outer surface of the inner yoke 210 and the inner surface of the winding ring 180 are spaced apart from each other by a predetermined distance 1. The distance 1 effectively corresponds to a tilt phenomenon of the bobbin 150, which occurs when the bobbin 150 moves in the first direction.

The tilt phenomenon is a phenomenon in which the bobbin 150 does not move in the first direction but tilts in a second-axis direction and/or a third-axis direction due to deflection by the electromagnetic force applied to the bobbin 150 or structural factors of the lens moving apparatus.

Even when the tilt phenomenon occurs, it is possible to prevent limited or unnatural movement of the bobbin 150 in the first direction due to the friction generated by excessive contact between the winding ring 180 and the inner yoke 210 by the provision of the distance 1. In addition, it is possible to considerably reduce wear or damage to the bobbin 150 and/or the winding ring 180 due to such friction.

Figure 11A:
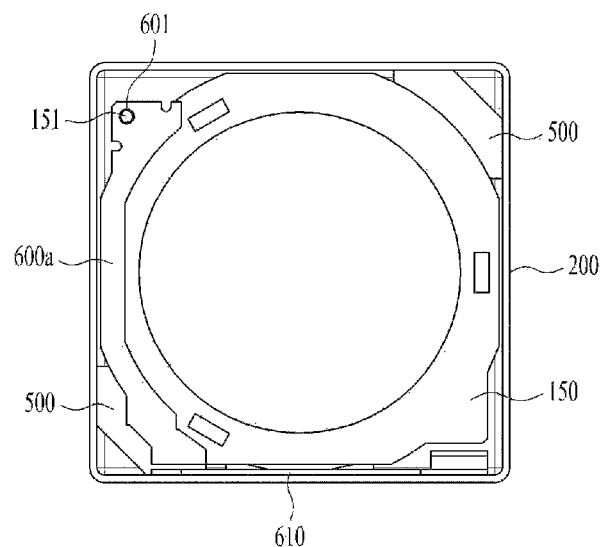
FIG. 11A is a bottom view showing a specific portion of the lens moving apparatus according to an embodiment.
Figure 11B:
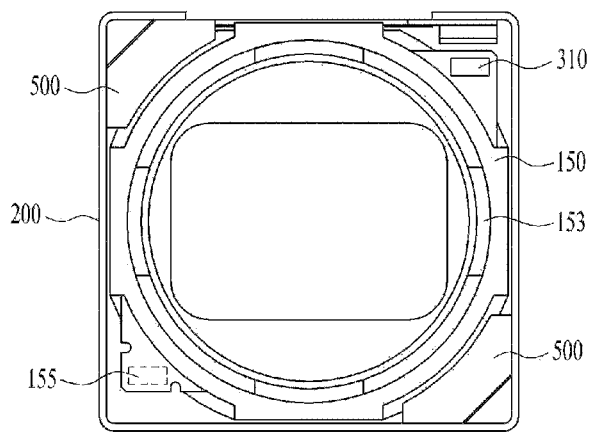
FIG. 11B is a plan view showing the specific portion of the lens moving apparatus according to the embodiment.

FIG. 11A is a bottom view showing a specific portion of the lens moving apparatus according to an embodiment. FIG. 11B is a plan view showing the specific portion of the lens moving apparatus according to the embodiment. Hereinafter, the concrete structure of the embodiment will be described with reference to FIGS. 1A, 1B, 11A, and 11B.

An electrical conduction member 600 is provided at the lower side of the bobbin 150, and is connected to the coil 190, which is coupled to the bobbin 150. A flexible circuit board 600a shown in FIG. 1A may be used as an embodiment of the electrical conduction member 600. Alternatively, a leaf spring may be used. In the case in which a leaf spring is used, the leaf spring may be divided into at least two parts so as to be used as the electrical conduction member 600.

The flexible circuit board 600a is provided at the lower side of the mover 100, and is connected to the coil 190. The flexible circuit board 600a may be made of a flexible material so as to be deformed in the first direction in response to movement of the mover 100 in the first direction.

In the embodiment, the flexible circuit board 600a is connected to the coil 190 to supply current to the coil 190, and the movement of the bobbin 150 in the first direction is controlled by a displacement sensing unit 300 and a control driver (not shown) connected thereto. In the embodiment, therefore, the structure of the lens moving apparatus may be simplified.

As shown in FIG. 11A, one side of the flexible circuit board 600a is coupled to the lower portion of the bobbin 150, and the other side of the flexible circuit board 600a is coupled to a second circuit board 610. In an embodiment, one side of the flexible circuit board 600a may be coupled to a first protrusion 151 formed at the lower end of the bobbin 150, and the other side of the flexible circuit board 600a may be coupled to the second circuit board 610 using a conductive adhesive material. The flexible circuit board 600a may be provided with a coupling hole 601 or a coupling recess for coupling with the first protrusion 151.

Meanwhile, the flexible circuit board 600a may be disposed between the bobbin 150 and the base 700 so as to extend in a second direction and/or a third direction perpendicular to the first direction. When the bobbin 150 moves, for example upward, in the first direction, the portion of the flexible circuit board 600a coupled to the bobbin 150 moves upward. When the bobbin 150 moves downward, the portion of the flexible circuit board 600a coupled to the bobbin 150 moves downward.

In addition, in the embodiment, the cost may be reduced, and the process may be simplified. In addition, the number of first magnets 500 may be four.

Meanwhile, the embodiment may further include a second circuit board 610 attached to one side of the base 700 and/or the cover member 200 and connected to the flexible circuit board 600a. The second circuit board 610 may interconnect the flexible circuit board 600a and the control driver. The position sensor 320 may be mounted on the second circuit board 610.

The second circuit board 610 may be made of a flexible material, like the flexible circuit board 600a. However, the disclosure is not limited thereto. The second circuit board 610 may be made of a rigid material. The second circuit board 610 may be made of a flexible material or a rigid material depending on the overall structure of the lens moving apparatus, the ease in manufacturing the second circuit board 610, and the manufacturing cost of the second circuit board 610.

An elastic member 600b shown in FIG. 1B may be used as another embodiment of the electrical conduction member 600. One side of the elastic member 600b may be connected to the bobbin 150, and the other side of the electrical conduction member 600 may be connected to the second circuit board 610.

In the embodiment, the elastic member 600b may have a shape similar to that of a lower elastic member used in a general lens moving apparatus. The elastic member 600b may interconnect the coil 190, which is disposed on the bobbin 150, and the second circuit board 610 so as to supply current to the coil 190. The elastic member 600b is advantageous in terms of cost reduction, since the manufacturing cost of the elastic member 600b is lower than that of the flexible circuit board 600a.

Meanwhile, unlike the embodiment, the lens moving apparatus may include elastic members provided at the upper and lower portions of the bobbin 150 so as to be connected to the coil 190 for supplying current to the coil and flexibly or elastically supporting the movement of the bobbin 150 in the first direction, as in a general lens moving apparatus.

The base 700 may include base legs 720 coupled to the lower end of the cover member 200. The base legs 720 protrude in the first direction to support the first magnets 500 disposed in the cover member 200.

Consequently, the same number of base legs 720 as first magnets 500 may be provided so as to correspond to respective first magnets 500. Alternatively, four base legs 720 may be formed at respective corners of the cover member irrespective of number of first magnets 500. For example, the base legs 720 may be provided at the upper ends thereof with stairs (not shown) on which portions of the lower ends of the first magnets 500 are located so as to support the first magnets 500. In another embodiment, the upper ends of the base legs 720 may be fixed or coupled to the lower ends of the first magnets 500 using an adhesive, such as epoxy.

The displacement sensing unit 300 determines a displacement value of the bobbin 150 in the first direction. The displacement sensing unit 300 may include a second magnet 310 and a position sensor 320.

In an embodiment of the displacement sensing unit 300, as shown in FIGS. 1A and 11B, the second magnet 310 is mounted to the bobbin 150 of the mover 100, and the position sensor 320 may be provided in the cover member 200 at a position corresponding to the second magnet 310 so as to be spaced apart from the second magnet 310 by a predetermined distance.

In another embodiment of the displacement sensing unit 300, the second magnet 310 and the position sensor 320 may be disposed at positions reverse to those in the previous embodiment. That is, the position sensor 320 may be mounted to the bobbin 150 of the mover 100, and the second magnet 310 may be provided in the cover member 200 at a position corresponding to the position sensor 320 so as to be spaced apart from the position sensor 320 by a predetermined distance.

Meanwhile, the bobbin 150 may be further provided with a third magnet 155. As shown in FIG. 11B, the third magnet 155 is coupled to the bobbin 150 at a position symmetrical to the second magnet 310 to offset magnetic force and/or weight variation due to the second magnet 310. Consequently, the third magnet 155 offsets magnetic force variation due to the second magnet 310, whereby it is possible to considerably reduce the occurrence of a tilt phenomenon of the bobbin 150 and the lens barrel due to magnetic force and/or weight variation.

In addition, even in the case in which the position sensor 320 is mounted to the bobbin 150, the third magnet 155 may be coupled to the bobbin 150 at a position symmetrical to the position sensor 320.

The position sensor 320 may constitute a displacement sensing unit 300 for determining a displacement value of the bobbin 150 in the first direction together with the second magnet 310 mounted to the bobbin 150. To this end, the position sensor 320 may be disposed at a position corresponding to the second magnet 310 to sense the relative movement of the second magnet 310.

The position sensor 320 may be a sensor for sensing the change in magnetic force discharged from the second magnet 310 of the bobbin 150. In addition, the position sensor 320 may be a Hall sensor. However, the disclosure is not limited thereto. Any sensor capable of sensing the change in magnetic force may be used. Alternatively, a sensor for sensing a position other than magnetic force may be used. For example, a photo reflector may be used.

The displacement sensing unit 300, the second circuit board 610 connected to the coil 190 via the electrical conduction member 600, and the image sensor may be connected to the control driver, which is provided outside and/or inside the lens moving apparatus. In this connection, the movement of the bobbin 150 in the first direction is controlled by the control device using a feedback control method, i.e. a closed loop control method.

The movement of the bobbin 150 in the first direction is performed to automatically focus an image of a subject on the surface of the image sensor. Feedback control by the control driver for auto focusing is performed as follows.

Upon receiving a first direction displacement value of the bobbin 150 measured by the displacement sensing unit 300 and an image of a subject formed on the image sensor, the control driver determines whether the subject is in focus. Upon determining that the subject is not in focus, the amount of current that is supplied to the bobbin 150 is changed to move the bobbin 150 in the first direction. A first direction displacement value of the bobbin 150 and an image of the subject are received again by the control driver, and then the control driver determines whether the subject is in focus.

The above process is repeated until the control driver accurately focuses on the subject. The control driver repeatedly adjusts the first direction displacement value of the bobbin 150 to perform auto focusing. This process is performed using a feedback control method, as described above.

Meanwhile, a camera module including the lens moving apparatus may include a cover member 200, a bobbin 150, a lens barrel, an electrical conduction member 600, an image sensor, and a printed circuit board.

The cover member 200 may be hollow, and may be integrally formed with an inner yoke 210 for blocking a magnetic field, as described above. The bobbin 150 may be provided in the cover member 200 so as to be moved in the first direction by an electromagnetic interaction.

The lens barrel may be coupled to the inside of the bobbin 150 using various coupling methods, such as a screw-coupling method, as described above. As described above, the electrical conduction member 600 is provided at the lower side of the bobbin 150 and is connected to the coil 190 coupled to the bobbin 150.

The image sensor is provided at the lower portion of the base 700. A picture of a subject incident through the lens barrel is formed on the image sensor. The printed circuit board may be connected to the image sensor to receive image information of the subject from the image sensor.

In the embodiment, a closed loop control method is used, whereby auto focusing is accurately and rapidly performed.

In addition, in the embodiment, the upper elastic member is not used. Consequently, it is possible to easily adjust the height of the upper surface of the bobbin 150, whereby bonding may be easily performed when the lens or the lens barrel is assembled to the bobbin 150.

In addition, since the winding ring 180 is coupled to the bobbin 150, and the coil 190 is wound around the winding ring 180 in the embodiment, it is possible to considerably reduce deformation of the bobbin 150 due to heat or tension generated during winding of the coil 190, thereby preventing the change of a lens assembly torque.

Figure 12A:
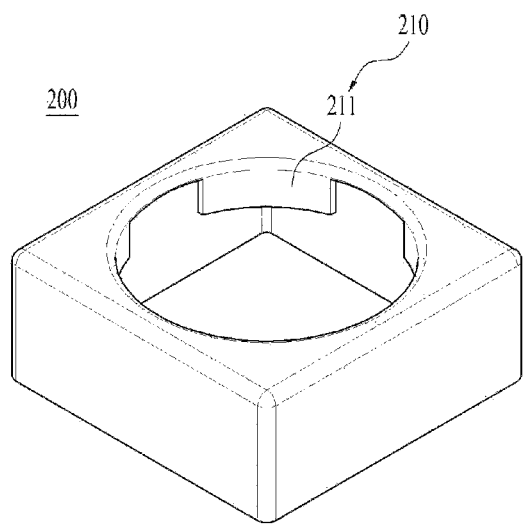
FIGS. 12A and 12B are a plan view and a bottom view, respectively, showing a cover member according to an embodiment.
Figure 12B:
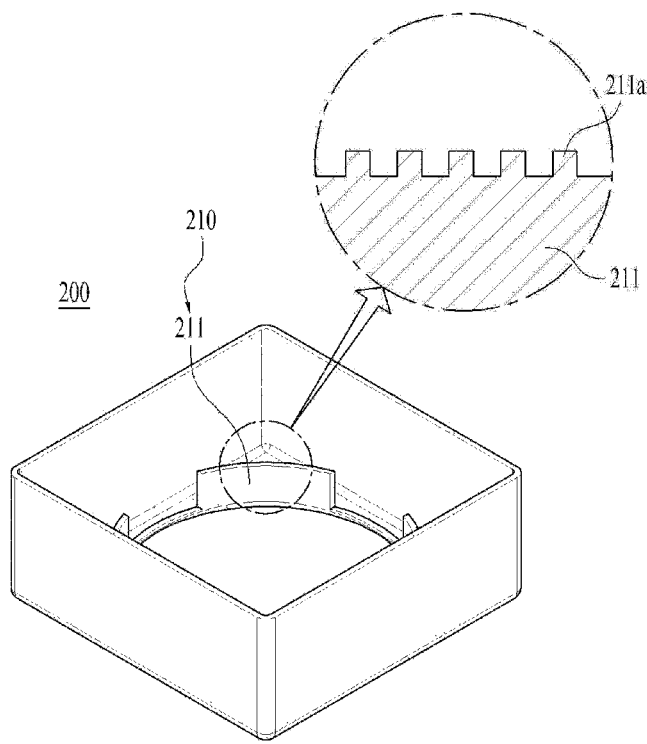
Figure 13:
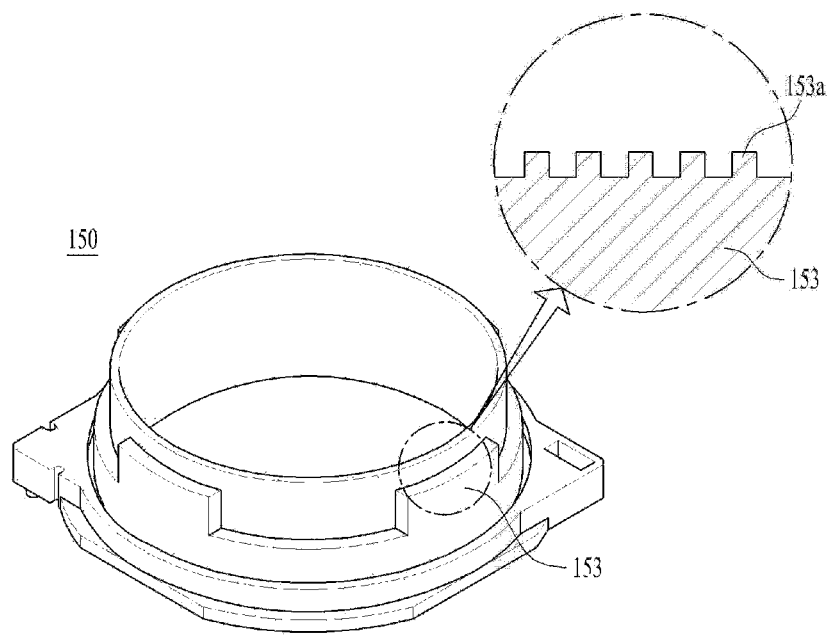
FIG. 13 is a perspective view showing a bobbin according to an embodiment.

FIGS. 12A and 12B are a plan view and a bottom view, respectively, showing a cover member 200 according to an embodiment. FIG. 13 is a perspective view showing a bobbin 150 according to an embodiment.

In the embodiment, the entirety of the inner yoke may be formed in a concave and convex shape to constitute a first concave and convex portion 211.

In addition, in the embodiment, a second concave and convex portion 153 may be formed at the bobbin 150. The second concave and convex portion 153 may have a concave and convex shape formed in the first direction, and may have a closed curve having the same shape as the entirety of the bobbin 150 when viewed in the first direction.

In the first direction, the first concave and convex portion 211 may extend downward, and the second concave and convex portion 153 may extend upward. The first concave and convex portion 211 and the second concave and convex portion 153 may be engaged with each other. Since the first concave and convex portion 211 and the second concave and convex portion 153 are engaged with each other, it is possible to prevent the bobbin 150 and the cover member 200 from rotating relative to each other when the bobbin 150 is coupled to the cover member 200, which includes the inner yoke.

Meanwhile, in the figures, the first concave and convex portion 211 and the second concave and convex portion 153 are formed in a quadrangular shape. However, the disclosure is not limited thereto. That is, the first concave and convex portion 211 of the cover member 200 may be formed in at least one selected from among a quadrangular shape, a trapezoidal shape, a triangular shape, and a circular shape, and the second concave and convex portion 153 of the bobbin 150 may be formed in a shape that can engage with the first concave and convex portion 211.

In addition, the first concave and convex portion 211 and the second concave and convex portion 153 may be formed in various shapes other than the above-mentioned shapes as long as the first concave and convex portion 211 and the second concave and convex portion 153 are engaged with each other. Furthermore, the concave and convex portion may not be symmetrical and/or uniform.

Meanwhile, in the case in which the first concave and convex portion 211 is formed in a quadrangular shape, the first concave and convex portion 211 may be further provided with a third concave and convex portion 211a. The third concave and convex portion 211a is formed on the protruding end of the first concave and convex portion 211 to reduce the contact area between the first concave and convex portion 211 of the cover member 200 and the second concave and convex portion 153 of the bobbin 150, thereby reducing the amount of noise generated due to contact between the bobbin 150 and the cover member 200.

In addition, in the case in which the second concave and convex portion 153 is formed in a quadrangular shape, the second concave and convex portion 153 may be further provided with a fourth concave and convex portion 153a. The fourth concave and convex portion 153a is formed on the protruding end of the second concave and convex portion 153 to reduce the contact area between the second concave and convex portion 153 of the bobbin 150 and the first concave and convex portion 211 of the cover member 200, thereby reducing the amount of noise generated due to contact between the bobbin 150 and the cover member 200.

In the same manner as in the first concave and convex portion 211 and/or the second concave and convex portion 153, the third concave and convex portion 211a and/or the fourth concave and convex portion 153a are shown as being formed in a quadrangular shape in the figures. However, the disclosure is not limited thereto. That is, the third concave and convex portion 211a and/or the fourth concave and convex portion 153a may be formed in at least one selected from among a quadrangular shape, a trapezoidal shape, a triangular shape, and a wave shape. In addition, the third concave and convex portion 211a and/or the fourth concave and convex portion 153a may be formed in various shapes other than the above-mentioned shapes. Furthermore, the concave and convex portion may not be symmetrical and/or uniform.

Figure 14:
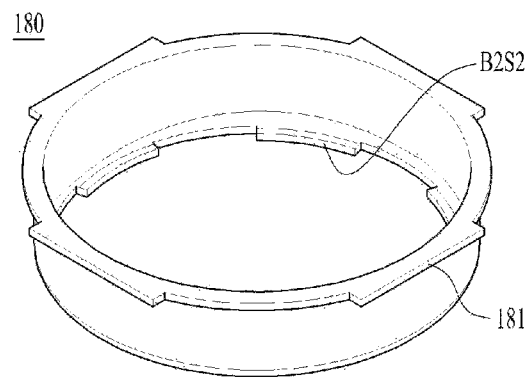
FIG. 14 is a perspective view showing a winding ring according to an embodiment.
Figure 15:
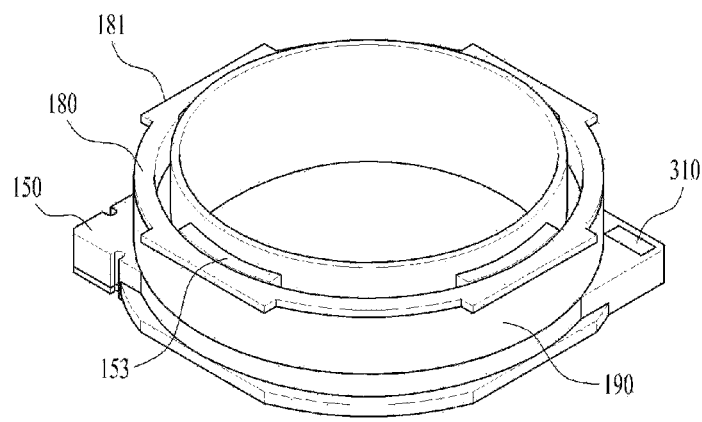
FIG. 15 is a perspective view showing the state in which a bobbin, a winding ring, and a coil according to an embodiment are coupled to each other.

FIG. 14 is a perspective view showing a winding ring 180 according to an embodiment. FIG. 15 is a perspective view showing the state in which a bobbin 150, a winding ring 180, and a coil 190 according to an embodiment are coupled to each other.

In the embodiment, the winding ring 180 may be provided at the upper end thereof with a rotation preventing portion 181 for preventing the rotation of the winding ring 180. In the same manner as in the catching protrusions B2S2, the rotation preventing portion may prevent the rotation of the winding ring 180. In the embodiment, the winding ring 180 may be provided at the upper end thereof with a rotation preventing portion 181 for preventing the rotation of the winding ring 180. The rotation preventing portion 181 may be provided at each of the embodiments of the winding ring 180 shown in FIGS. 4 to 8.

At least one rotation preventing portion 181 may be formed at the upper end of the winding ring 180 by bending, and the end of the rotation preventing portion 181 may be formed in a straight shape so as to correspond to the inner surface of the cover member 200, at least a portion of which is flat.

Specifically, at least a pair of rotation preventing portions 181 may be provided so as to face each other. In addition, the rotation preventing portions 181 may be provided at the upper end of the winding ring 180 in a symmetrical or radial manner so as to correspond to the inner surface of the cover member 200, at least a portion of which is flat.

In the embodiment, four rotation preventing portions 181 are radially formed at the upper end of the winding ring 180 by bending. Alternatively, two rotation preventing portions 181 may be provided so as to face each other. In addition, in the case in which the cover member 200 is octagonal, two, four, or eight rotation preventing portions 181 may be provided in a symmetrical or radial manner. In addition, an odd or even number of rotation preventing portions 181 may be provided. In addition, a plurality of rotation preventing portions 181 may be provided so as to correspond to the inner surface of the cover member 200.

When the lens barrel is rotated so as to screw-couple the lens barrel to the bobbin during the assembly of the lens moving apparatus, the lens barrel may contact a portion of the cover member 200 or at least a portion of the inner surface of the cover member, with the result that the mover 100 may rotate, whereby an assembly error may occur. The rotation preventing portions 181 considerably reduce the incidence of such assembly error. The rotation preventing portions 181 may be disposed between the respective convex portions of the inner yoke 210, i.e. in the respective concave portions of the inner yoke 210, such that the convex portions of the inner yoke 210 and the rotation preventing portions 181 are alternatively arranged around the circumferential surface of the bobbin 150.

Since the catching protrusions B2S2 and the rotation preventing portions 181 serve to prevent the rotation of the winding ring 180, both the catching protrusions B2S2 and the rotation preventing portions 181 may be formed at the winding ring 180, or only one selected from between the catching protrusions B2S2 and the rotation preventing portions 181 may be formed at the winding ring 180, as needed.

Figure 16:
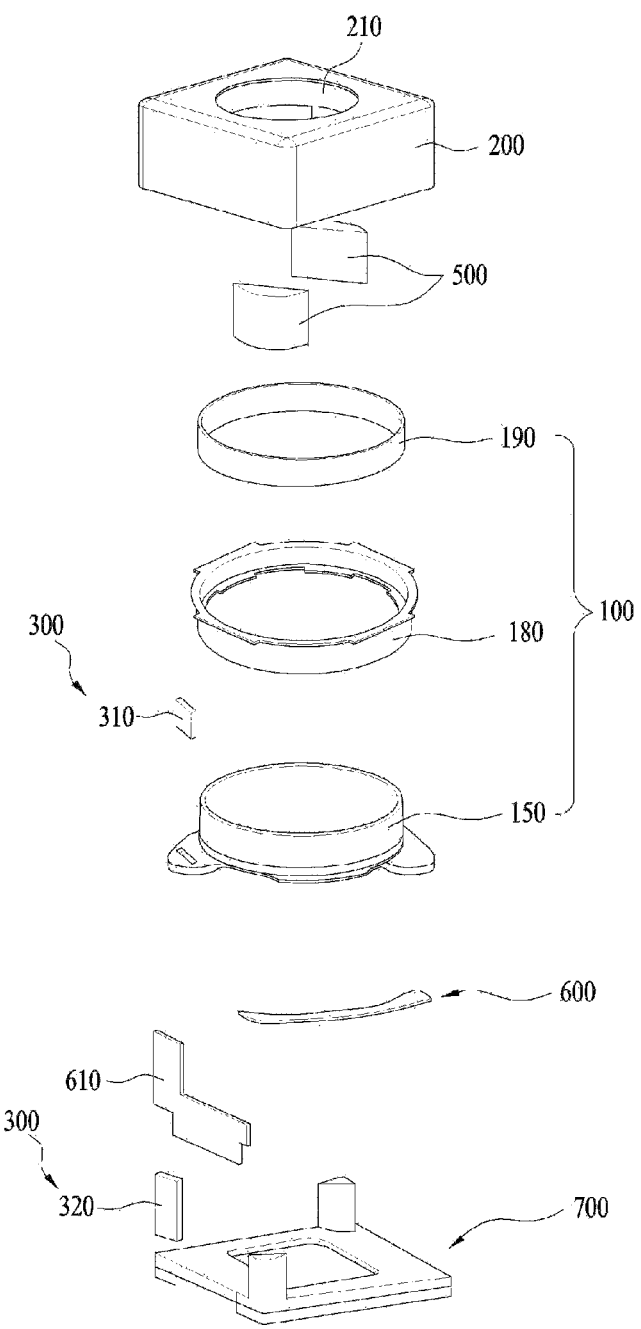
FIG. 16 is an exploded perspective view showing a lens moving apparatus according to a further embodiment.

FIG. 16 is an exploded perspective view showing a lens moving apparatus according to a further embodiment. The lens moving apparatus according to the embodiment shown in FIG. 16 is identical in construction to the lens moving apparatus shown in FIG. 1A or 1B except the yoke 210. Hereinafter, the embodiment will be described based on the yoke 210 and the flexible circuit board 600, which is an embodiment of the electrical conduction member.

Figure 17A:
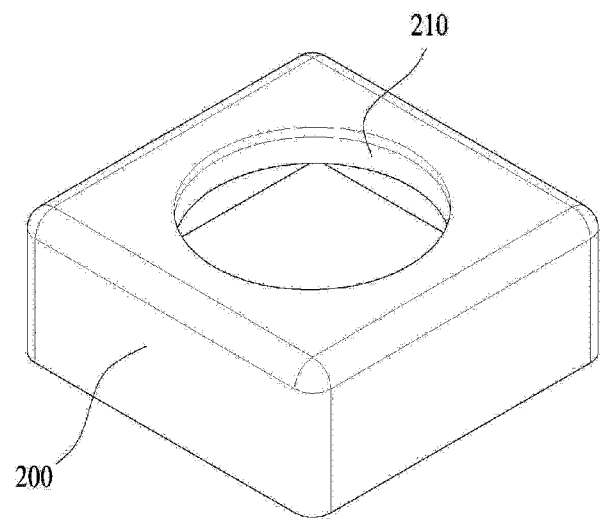
FIGS. 17A and 17B are a perspective view and a bottom perspective view, respectively, showing a cover member according to an embodiment.
Figure 17B:
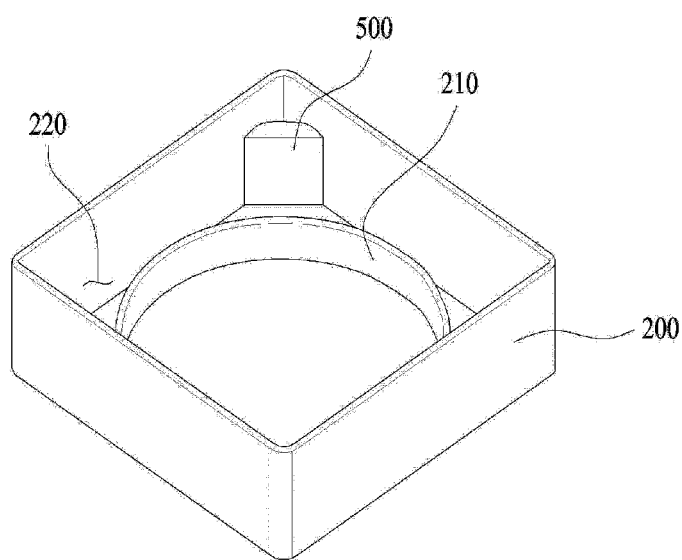

FIGS. 17A and 17B are a perspective view and a bottom perspective view, respectively, showing a cover member 200 according to an embodiment. The cover member 200 is hollow, and the external shape of the cover member 200 is approximately quadrangular. Specifically, the corners of the cover member 200 are rounded. Alternatively, the corners of the cover member 200 may be chamfered such that the cover member is octagonal.

A hollow yoke 210 for preventing the leakage of a magnetic field is provided at the inner circumferential surface of the upper portion of the cover member 200 so as to be integrally formed with the cover member 200. The outer surface of the inner yoke 210 and the inner surface of the cover member 200 are spaced apart from each other by a predetermined distance to form a receiving portion 220 therebetween.

As described above, at least a portion of the winding ring 180 and/or the coil 190 may be received in the receiving portion 220. In addition, at least a portion of the first magnets 500, the second magnet 310 coupled to the bobbin 150, and the position sensor 320, provided so as to face the second magnet 310, may be received in the receiving portion 220.

In the embodiment, a pair of magnets may be provided at corners of the receiving portion 220 so as to face each other, and the second magnet 310 and the position sensor 320 may be provided at the corner of the receiving portion 120 at which the magnets are not provided.

The arrangement of elements in the receiving portion 220 is optimized based on the shape of the cover member 200. However, the disclosure is not limited thereto. In other embodiments, the arrangement of elements may be variously changed depending on the shape and number of the first magnets 500, the shape of the cover member 200, and the shape of the yoke 210.

Figure 18:
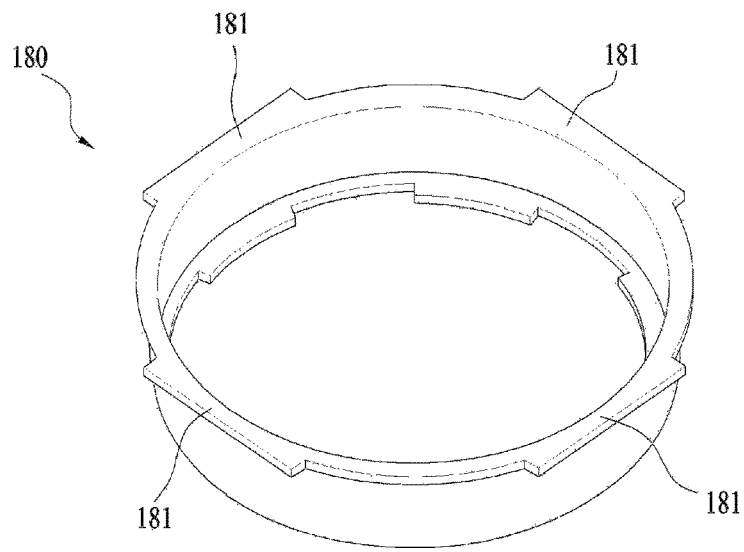
FIG. 18 is a perspective view showing a modification of the winding ring according to the embodiment.

FIG. 18 is a perspective view showing a modification of the winding ring 180 according to the embodiment. In the modification, the winding ring 180 may be provided at the upper end thereof with a rotation preventing portion 181 for preventing the rotation of the winding ring 180. The rotation preventing portion 181 may be provided at each of the embodiments of the winding ring 180 shown in FIGS. 4 to 8.

At least one rotation preventing portion 181 may be formed at the upper end of the winding ring 180 by bending, and the end of the rotation preventing portion 181 may be formed in a straight shape so as to correspond to the inner surface of the cover member 200, at least a portion of which is flat.

Specifically, at least a pair of rotation preventing portions 181 may be provided so as to face each other. In addition, the rotation preventing portions 181 may be provided at the upper end of the winding ring 180 in a symmetrical or radial arrangement so as to correspond to the inner surface of the cover member 200, at least a portion of which is flat.

In the modification, four rotation preventing portions 181 are radially formed at the upper end of the winding ring 180 by bending. Alternatively, two rotation preventing portions 181 may be provided so as to face each other. In addition, in the case in which the cover member 200 is octagonal, two, four, or eight rotation preventing portions 181 may be provided in a symmetrical or radial arrangement. In addition, an odd or even number of rotation preventing portions 181 may be provided. In addition, a plurality of rotation preventing portions 181 may be provided so as to correspond to the inner surface of the cover member 200.

When the lens barrel is rotated so as to screw-couple the lens barrel to the bobbin during the assembly of the lens moving apparatus, the lens barrel may contact at least a portion of the inner surface of the cover member 200, with the result that the mover 100 may rotate, whereby an assembly error may occur. The rotation preventing portions 181 considerably reduce the incidence of such assembly error.

Figure 19:
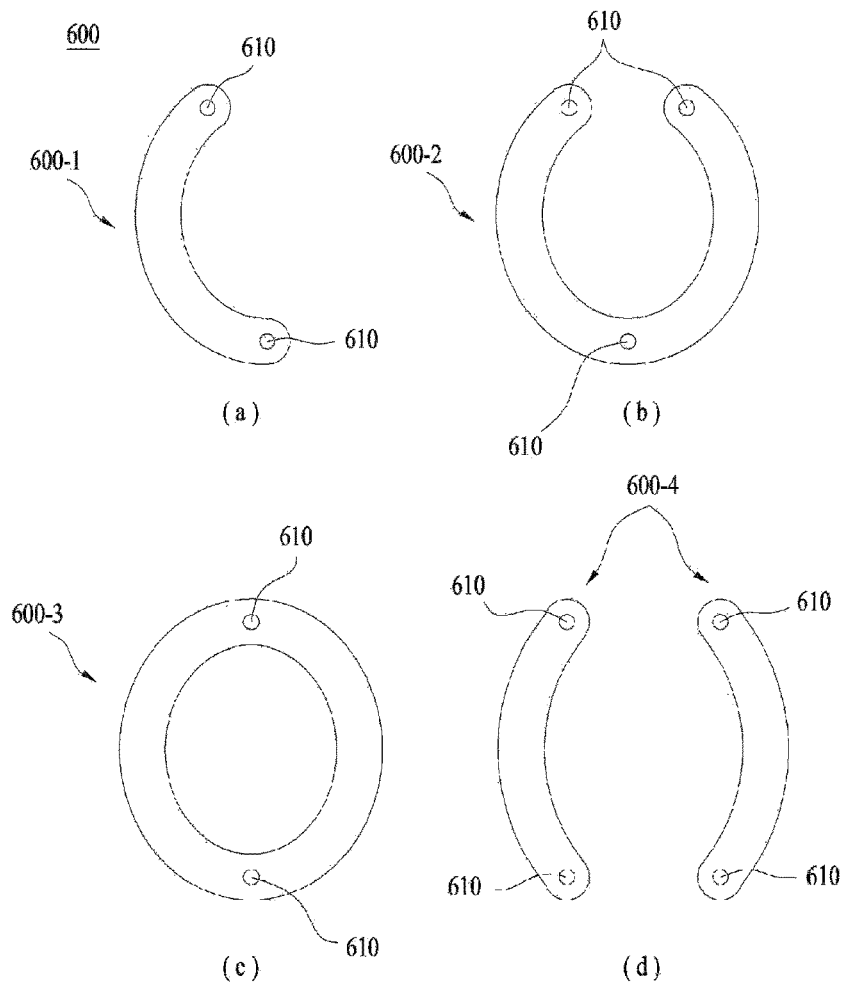
FIG. 19 is a schematic view showing embodiments of a flexible circuit board.

FIG. 19 is a schematic view showing embodiments of the flexible circuit board 600. The flexible circuit board 600 may be formed to have various shapes, as long as one side of the flexible circuit board 600 is coupled to the lower portion of the bobbin 150 and the other side of the flexible circuit board 600 is coupled to the upper portion of the base 700 to supply current to the coil 190. In this case, however, the flexible circuit board 600 may be located at the edge of the bobbin 150 and the base 700 so as not to obstruct the visual field of an image sensor (not shown), which is provided at the lower portion of the lens moving apparatus.

In an embodiment, the flexible circuit board 600 may be crescent-shaped. One side of the flexible circuit board 600 may be coupled to the bobbin 150, and the other side of the flexible circuit board 600 may be coupled to the base 700 (a). In another embodiment, the flexible circuit board 600 may be formed in the shape of a horseshoe having an opening (b). In another embodiment, the flexible circuit board 600 may be formed in the shape of a hollow closed curve (c). In a further embodiment, a plurality of crescent-shaped flexible circuit boards 600 may be provided, and the flexible circuit boards 600 may be provided at the lower side of the mover 100 so as to be symmetrical to each other in the first direction.

In the embodiments, the flexible circuit board 600 is provided with coupling holes 610 for coupling with the bobbin 150 or the base 700. Alternatively, the coupling holes 610 may not be provided, or protrusions or recesses may be provided in place of the coupling holes 610, depending on how the flexible circuit board 600 is coupled to the bobbin 150 and the base 700.

Meanwhile, the lens moving apparatus according to each of the embodiments described above may be used in various kinds of applications, such as a camera module. The camera module may be used in, for example, mobile devices such as mobile phones.

The camera module may include a lens barrel coupled to the bobbin 150, an image sensor (not shown), a printed circuit board (not shown), and an optical system.

The lens barrel may be configured as previously described. The printed circuit board, which is a part on which the image sensor is mounted, may constitute the lower surface of the camera module.

In addition, the optical system may include at least one lens for transmitting a picture to the image sensor. An actuator module having an auto focusing function and a camera shaking correction function may be mounted in the optical system. The actuator module having the auto focusing function may be variously configured. A voice coil unit motor is generally used. The lens moving apparatus according to each of the embodiments described above may serve as an actuator module having both an auto focusing function and a camera shaking correction function.

In addition, the camera module may further include an infrared cutoff filter (not shown). The infrared cutoff filter prevents infrared light from being incident on the image sensor. In this case, the infrared cutoff filter may be mounted at the base 700 illustrated in FIG. 16 so as to correspond to the image sensor. The infrared cutoff filter may be coupled to a holder member (not shown). In addition, the base 700 may support the lower side of the holder member.

The base 700 may be provided with an additional terminal member for electrical conduction with the printed circuit board. The terminal member may be integrally formed using a surface electrode. Meanwhile, the base 700 may serve as a sensor holder for protecting the image sensor. In this case, a protrusion may be formed along the edge of the base 700 so as to protrude downward. However, this construction is not indispensable. Although not shown, an additional sensor holder may be disposed at the lower portion of the base 700.

Although embodiments have been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

INDUSTRIAL APPLICABILITY

According to embodiments, it is possible to provide a lens moving apparatus configured such that noise is reduced, a mechanical resonance phenomenon is reduced, the structure of the lens moving apparatus is simplified, and the manufacturing cost of the lens moving apparatus is reduced. Consequently, embodiments have industrial applicability.

The invention claimed is:

1. A lens moving apparatus comprising:
a cover member;
a bobbin including a recess and disposed in the cover member so as to be movable in a first direction;
a first magnet disposed in the cover member for moving the bobbin in the first direction;
a winding ring coupled to the bobbin, the winding ring comprising a first portion inserted into the recess and directly coupled to the recess and a second portion disposed at an outside of the recess, wherein the first portion of the winding ring is in direct physical contact with a lower surface of the recess;
a coil directly wound around an outer circumferential surface of the second portion of the winding ring for supplying current to the bobbin such that the bobbin is moved in the first direction, wherein the coil is in direct physical contact with the outer circumferential surface of the second portion of the winding ring;
an electrical conduction member provided at a lower portion of the bobbin;
a position sensor disposed on one of the cover member and the bobbin;
a second magnet disposed on the other of the cover member and the bobbin; and
a second circuit board electrically connected to the electrical conduction member,
wherein the winding ring is physically spaced apart from the cover member and is movable together with the bobbin in the first direction. and
wherein the winding ring is disposed between, in a lateral direction perpendicular to the optical axis direction, the bobbin and the coil,
wherein the winding ring is provided at an upper end thereof with a rotation preventing portion for preventing rotation of the winding ring, the rotation preventing portion being faulted at the upper end of the winding ring by bending, an end of the rotation preventing portion being formed in a straight shape so as to correspond to an inner surface of the cover member, at least a portion of which is flat,
wherein the winding ring is provided with a plurality of catching protrusions, each catching protrusion of the plurality of catching protrusions protruding from a lower end of the winding ring toward a center of the winding ring and being configured to increase a coupling force between the bobbin and the winding ring, and
wherein the catching protrusions of the plurality of catching protrusions are provided so as to be symmetrical to each other about the center of the winding ring.

2. The lens moving apparatus according to claim 1, comprising an inner yoke integrally formed at an inside of the cover member, wherein the electrical conduction member is configured such that one side of the electrical conduction member is coupled to the lower portion of the bobbin and the other side of the electrical conduction member is coupled to the second circuit board, the inner yoke has a first concave and convex portion, and the bobbin has a second concave and convex portion engaged with the first concave and convex portion.

3. The lens moving apparatus according to claim 2, wherein the first concave and convex portion is provided at a protruding end thereof with a third concave and convex portion, and the second concave and convex portion is disposed on a protruding end thereof with a fourth concave and convex portion.

4. The lens moving apparatus according to claim 2, wherein the inner yoke has a circular or polygonal sectional shape when viewed in the first direction, and the winding ring and the coil each have a circular or polygonal sectional shape corresponding to the shape of the inner yoke.

5. The lens moving apparatus according to claim 1, wherein
the second magnet is coupled to the cover member; and
the position sensor coupled to the bobbin at a position of the bobbin corresponding to the second magnet so as to be spaced apart from the second magnet by a predetermined distance.

6. The lens moving apparatus according to claim 1, wherein
the second magnet is coupled to the bobbin for serving as a sensing magnet; and the position sensor is electrically connected to the second circuit board and the second circuit board is coupled to the cover member.

7. The lens moving apparatus according to claim 1, wherein
the bobbin comprises: a first body unit for receiving at least one lens; and a supporting portion protruding outward from the first body unit, and
the winding ring comprises a second body unit supported by the supporting portion, the second body unit comprising the first portion and the second portion, and
wherein the coil is disposed between an upper surface of the second body and a lower surface of the second body.

8. The lens moving apparatus according to claim 7, wherein
the supporting portion comprises the recess, the recess including a first recess extending in
the first direction and a second recess communicating with the first recess and extending in a second direction different from the first direction, and
the first portion of the winding ring is formed so as to be received in the first recess or in both the first recess and the second recess.

9. The lens moving apparatus according to claim 7, wherein the second body unit comprises;
at least one second body around which the coil is wound.

10. The lens moving apparatus according to claim 9, wherein the second body comprises a plurality of second bodies, each of which is formed in a pillar shape, the second bodies are spaced apart from each other, and a distance by which the second bodies are spaced apart from each other is greater than a width of each of the second bodies.

11. The lens moving apparatus according to claim 10, wherein the second body unit comprises a lower end connection portion for interconnecting lower ends of the second bodies, and the lower end connection portion comprises the plurality of catching protrusions protruding inward from the first portion of the second body unit.

12. A lens moving apparatus comprising:
a cover member;
a bobbin including a recess and disposed in the cover member so as to be movable in a first direction;
a first magnet disposed in the cover member for moving the bobbin in the first direction;
a winding ring coupled to the bobbin, the winding ring comprising a first portion inserted into the recess and directly coupled to the recess and a second portion disposed at an outside of the recess, wherein the first portion of the winding ring is in direct physical contact with a lower surface of the recess;
a coil directly wound around an outer circumferential surface of the second portion of the winding ring for supplying current to the bobbin such that the bobbin is moved in the first direction, wherein the coil is in direct physical contact with the outer circumferential surface of the second portion of the winding ring;
a base disposed under the bobbin; and
a flexible circuit board electrically connected to the coil, the flexible circuit board having a first side coupled to a lower portion of the bobbin and a second side coupled to an upper portion of the base, such that the flexible circuit board takes the place of a lower elastic member, which is omitted from the lens moving apparatus,
wherein the winding ring is physically spaced apart from the cover member and is movable together with the bobbin in the first direction, and wherein the winding ring is disposed between, in a lateral direction perpendicular to the optical axis direction, the bobbin and the coil, wherein the winding ring is provided at an upper end thereof with a rotation preventing portion for preventing rotation of the winding ring, the rotation preventing portion being formed at the upper end of the winding ring by bending, an end of the rotation preventing portion being formed in a straight shape so as to correspond to an inner surface of the cover member, at least a portion of which is flat, wherein the winding ring is provided with a plurality of catching protrusions, each catching protrusion of the plurality of catching protrusions protruding from a lower end of the winding ring toward a center of the winding ring and being configured to increase a coupling force between the bobbin and the winding ring, and wherein the catching protrusions of the plurality of catching protrusions are provided so as to be symmetrical to each other about the center of the winding ring.

13. The lens moving apparatus according to claim 12, wherein
the lens moving apparatus comprises a second circuit board disposed on one side of the base and/or the cover member, the second circuit board being connected to the flexible circuit board.

14. The lens moving apparatus according to claim 13, wherein the flexible circuit board is configured such that the first side of the flexible circuit board is coupled to a first protrusion formed at the lower portion of the bobbin and the second side of the flexible circuit board is coupled to a second protrusion formed at the base.

15. The lens moving apparatus according to claim 12, wherein the flexible circuit board extends in a second direction and/or a third direction perpendicular to the first direction.

16. The lens moving apparatus according to claim 12, wherein
a hollow yoke for preventing leakage of a magnetic field is provided at an inner circumferential surface of an upper portion of the cover member,
the yoke has a circular or polygonal sectional shape when viewed in the first direction, and
the winding ring and the coil each have a circular or polygonal sectional shape corresponding to the shape of the yoke.

17. The lens moving apparatus according to claim 16, wherein
an outer surface of the yoke and an inner surface of the cover member are spaced apart from each other by a predetermined distance to form a receiving portion therebetween, and
the receiving portion is formed in a shape having a closed upper end and an open lower end, the receiving portion extending in a circumferential direction of the yoke.

18. The lens moving apparatus according to claim 17, wherein at least a portion of the winding ring and/or the coil is received in the receiving portion, and the yoke and the winding ring are provided in the receiving portion such that the outer surface of the yoke and the inner surface of the winding ring correspond to each other in a state in which the outer surface of the yoke and the inner surface of the winding ring are spaced apart from each other by a predetermined distance.

* * * * *